US012724522B2

(12) United States Patent
Li

(10) Patent No.: US 12,724,522 B2
(45) Date of Patent: Sep. 1, 2026

(54) DATA CONTENT PROCESSING METHOD AND APPARATUS, TERMINAL, AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventor: Hao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 371 days.

(21) Appl. No.: 18/498,280

(22) Filed: Oct. 31, 2023

(65) Prior Publication Data

US 2024/0061542 A1 Feb. 22, 2024

Related U.S. Application Data

(63) Continuation of application No. PCT/CN2022/086436, filed on Apr. 12, 2022.

(30) Foreign Application Priority Data

May 26, 2021 (CN) ........................ 202110577278.5

(51) Int. Cl.
*G06F 3/0481* (2022.01)
*G06F 3/0482* (2013.01)
(Continued)

(52) U.S. Cl.
CPC .......... *G06F 3/0481* (2013.01); *G06F 3/0486* (2013.01); *G06F 9/451* (2018.02);
(Continued)

(58) Field of Classification Search
CPC .... G06F 3/0481; G06F 3/0482; G06F 3/0486; G06F 3/04842; G06F 9/543; G06F 9/451;
(Continued)

(56) References Cited

U.S. PATENT DOCUMENTS 10,489,032 B1 * 11/2019 Margolin ............ G06F 21/6245
2011/0177798 A1 * 7/2011 Aoki ................ H04M 1/72469
455/566

(Continued)

FOREIGN PATENT DOCUMENTS

CN 103472974 A 12/2013
CN 105323272 A 2/2016

(Continued)

OTHER PUBLICATIONS

Chinese Review Decision Letter, Chinese Application No. 202110577278.5, mailed Aug. 14, 2024 (2 pages).

(Continued)

*Primary Examiner* — Ting Z Lee
(74) *Attorney, Agent, or Firm* — Ladas & Parry LLP

(57) ABSTRACT

A data content processing method and apparatus, a terminal, and a storage medium, belonging to the technical field of terminals. The method includes: in response to a call-out operation on a content integration platform, determining content types of data content in the content integration platform; obtaining the data content on the basis of a content acquisition mode corresponding to the content types; displaying the data content of at least two content types in a platform floating window corresponding to the content integration platform; and in response to a trigger operation on target data content in the platform floating window, processing the target content data. The data content processing method can improve the processing efficiency of data content in a terminal by a user.

18 Claims, 14 Drawing Sheets

(51) Int. Cl.

| | |
|---|---|
| ***G06F 3/04842*** | (2022.01) |
| ***G06F 3/0486*** | (2013.01) |
| ***G06F 9/451*** | (2018.01) |
| ***G06F 9/54*** | (2006.01) |
| ***G06F 21/10*** | (2013.01) |
| ***G06F 21/30*** | (2013.01) |
| ***G06F 21/44*** | (2013.01) |

(52) U.S. Cl.
CPC .......... *G06F 9/543* (2013.01); *G06F 21/1064* (2023.08); *G06F 3/0482* (2013.01); *G06F 3/04842* (2013.01); *G06F 21/106* (2023.08); *G06F 21/30* (2013.01); *G06F 21/44* (2013.01)

(58) Field of Classification Search
CPC .... G06F 21/1064; G06F 21/106; G06F 21/30; G06F 21/44
See application file for complete search history.

(56) References Cited

U.S. PATENT DOCUMENTS

| | | | | |
|---|---|---|---|---|
| 2015/0310220 | A1* | 10/2015 | Brooks | G06F 21/606 713/189 |
| 2018/0052587 | A1 | 2/2018 | LaPier et al. | |
| 2019/0005139 | A1 | 1/2019 | Ford et al. | |
| 2019/0303596 | A1* | 10/2019 | Du | G06F 21/629 |
| 2021/0400037 | A1* | 12/2021 | Montgomerie | H04L 63/0853 |
| 2023/0418694 | A1* | 12/2023 | Meen | G06F 9/543 |

FOREIGN PATENT DOCUMENTS

| | | | |
|---|---|---|---|
| CN | 106484224 | A | 3/2017 |
| CN | 107220555 | A | 9/2017 |
| CN | 108700984 | A | 10/2018 |
| CN | 109164964 | A | 1/2019 |
| CN | 109582475 | A | 4/2019 |
| CN | 109683760 | A | 4/2019 |
| CN | 111324398 | A | 6/2020 |
| CN | 112667142 | A | 4/2021 |
| CN | 112698964 | A | 4/2021 |
| CN | 113360226 | A | 9/2021 |

OTHER PUBLICATIONS

Chinese Notification to Grant Patent Right for Invention, Chinese Application No. 202110577278.5, mailed Sep. 11, 2024 (5 pages).

https://blog.csdn.net/sinat_23971513/article/details/108544303; a useful man, Windows 10 System usage tip four—clipboard history _windows clipboard history; published on Sep. 12, 2020.

https://zhuanlan.zhihu.com/p/115082614; Introduction and use of Windows 10 clipboard for small black computers; published on Mar. 21, 2020.

https://cloud.tencent.com/developer/news/356999; Nov. 16, 2018; Tencent Cloud Developer, Such an efficient clipboard tool, you must give it a try!; published on Nov. 16, 2020.

Chinese Second Office Action, Chinese Application No. 202110577278.5, mailed Feb. 5, 2024 (16 pages).

Chinese Rejection decision, Application No. 202110577278.5, mailed Apr. 11, 2024 (18 pages).

Chinese First Office Action, Chinese Application No. 202110577278.5, mailed Sep. 8, 2023 (17 pages).

International Search Report and Written Opinion, International Application No. PCT/CN2022/086436, mailed Jun. 22, 2022 (18 pages).

* cited by examiner

DATA CONTENT PROCESSING METHOD AND APPARATUS, TERMINAL, AND NON-TRANSITORY COMPUTER-READABLE STORAGE MEDIUM

CROSS-REFERENCE TO RELATED APPLICATIONS

This present disclosure is a continuation-application of International (PCT) Patent Application No. PCT/CN2022/086436 filed Apr. 12, 2022, which claims priority to China Patent Applicant No. 202110577278.5, filed May 26, 2021, the entire contents of which are hereby incorporated by reference in their entirety.

TECHNICAL FIELD

The present disclosure relates to the field of terminal technologies, and in particular to a data content processing method and an apparatus, a terminal and a non-transitory computer-readable storage medium.

BACKGROUND

During daily use of a terminal, a user often needs to process recent content, for example, editing recently copied text, sharing pictures that are recently taken or downloaded, and so on.

When processing the recent content, the user first need to launch a corresponding application and use the application to view the recent content. For example, when viewing recent photos, the user is required to launch a photo album application and then select to view the recent photos in the photo album application.

Obviously, when viewing or processing the recent content of different types, the user need to launch different applications, which leads to a low efficiency in viewing and processing of the recent content.

SUMMARY OF THE DISCLOSURE

Some embodiments of the present disclosure provide a method, a terminal, and a non-transitory computer-readable storage medium for processing data contents. The technical solutions may include the following.

In a first aspect, some embodiments of the present disclosure provide a method for processing data contents, and the method may include the following:

- determining content types of data contents in a content integration platform, in response to a call-out operation applied on the content integration platform, where the content integration platform may be configured to integrate data contents of at least two content types;
- obtaining the data contents based on content acquisition modes corresponding to the content types;
- displaying the data contents of the at least two content types in a platform floating window corresponding to the content integration platform; and
- processing target data content, in response to a trigger operation on the target data content in the platform floating window.

In a second aspect, some embodiments of the present disclosure further provide a terminal and the terminal may include a processor and a memory. The memory may store at least one instruction. The processor may be caused to perform the method for processing data contents as described above, when the at least one instruction is executed by the processor.

In a third aspect, some embodiments of the present disclosure further provide a non-transitory computer-readable storage medium and the non-transitory computer-readable storage medium may store at least one instruction. A processor may be caused to perform the method for processing the data contents as described above, when the at least one instruction is executed by the processor.

DETAILED DESCRIPTION

To clarify the purposes, technical solutions, and advantages of the present disclosure, various embodiments of the present disclosure will be further described in detail based on the drawings.

References to "more than one" in this document refer to two or more. The term "and/or" describes an association relationship of associated objects, indicating that three kinds of relationships may exist, e.g., A and/or B may be indicated as: A alone, both A and B, and B alone. The character "/" generally indicates that the associated objects are in an "or" relationship.

Figure 1:
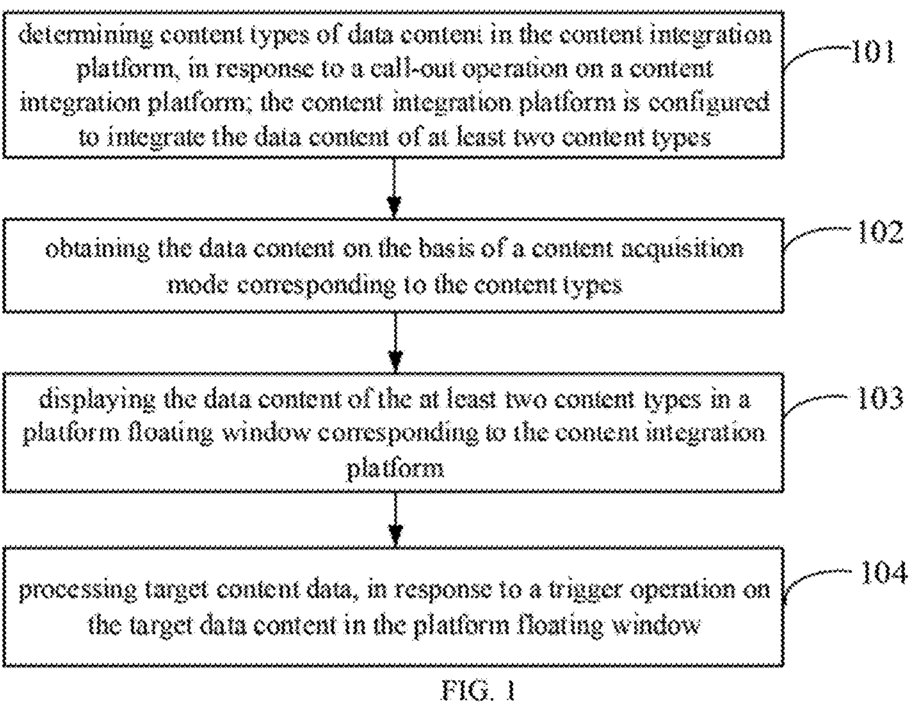
FIG. 1 is a flowchart of a data content processing method according to an embodiment of the present disclosure.

As shown in FIG. 1, a flowchart of a data content processing method according to an embodiment of the present disclosure is provided. This embodiment is illustrated by an example of the method being applied to a terminal and the method may include the following parts.

At block 101: in response to a call-out operation on a content integration platform, determining content types of data contents in the content integration platform; the content integration platform is configured to integrate the data contents of the at least two content types.

In order to improve a user's efficiency of processing data contents in the terminal, embodiments of the present disclosure provide a content integration platform to integrate and display the data contents of various content types in the terminal, such that the user may no longer have to open a specific application to process the corresponding data contents. The content integration platform may be encapsulated in a form of a shortcut tool icon, i.e. when the user clicks on the shortcut tool icon corresponding to the content integration platform, a call-out operation on the content integration platform may be confirmed to be received. The content integration platform may also be encapsulated in a form of a shortcut application icon, i.e. when the user clicks on the shortcut application icon corresponding to the content integration platform, a call-out operation on the content integration platform may be confirmed to be received.

In some embodiments, the shortcut icon corresponding to the content integration platform may be displayed in a side toolbar, i.e. when the user calls out the side toolbar, the shortcut icon corresponding to the content integration platform may be displayed in the side toolbar. The shortcut icon corresponding to the content integration platform may also be displayed in a notification bar, i.e. when the user calls out the notification bar, the shortcut icon corresponding to the content integration platform may be displayed in the notification bar. The shortcut icon corresponding to the content integration platform may be displayed in toolbars other than a terminal desktop as well.

Figure 2:
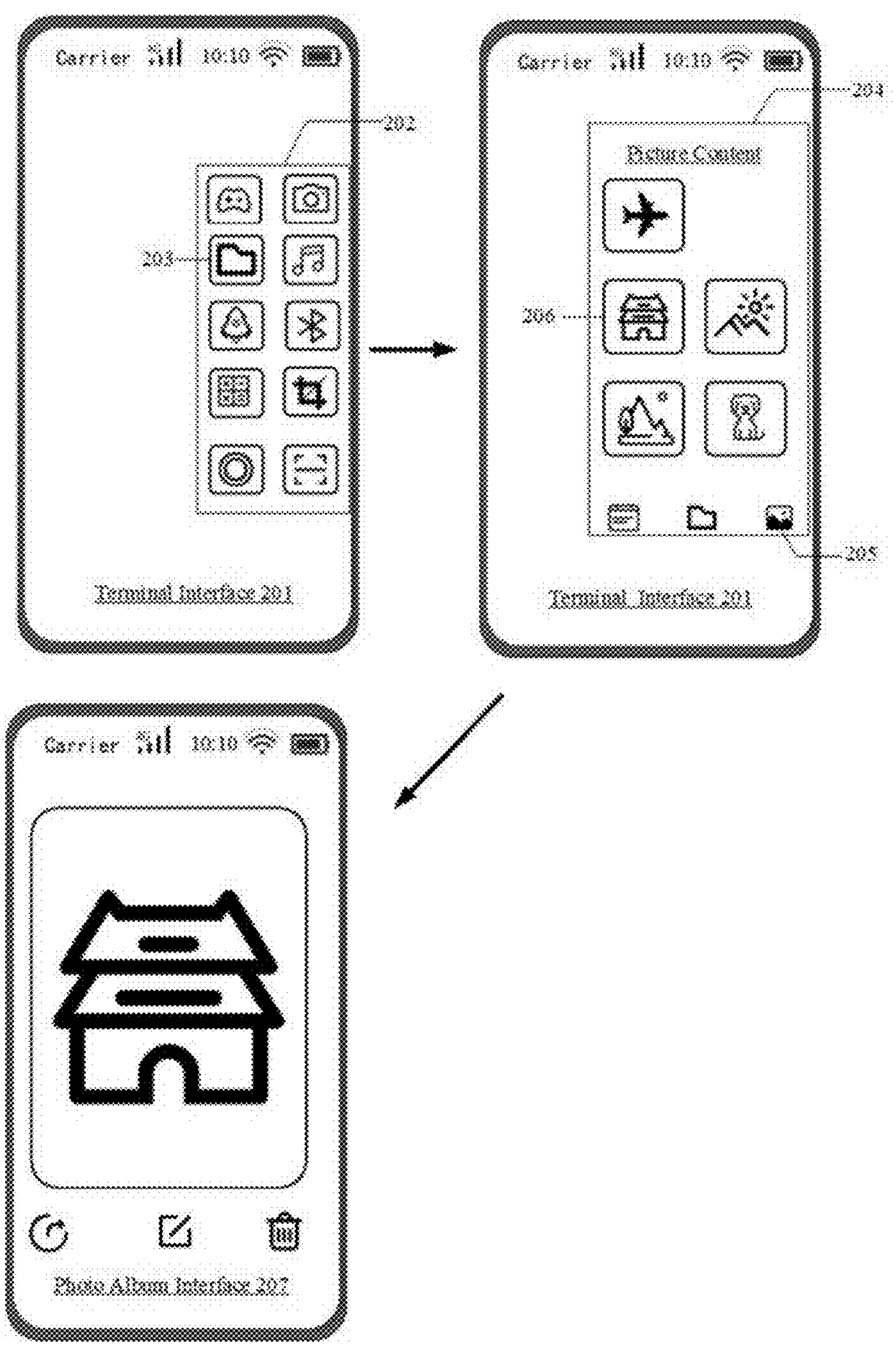
FIG. 2 is a schematic view illustrating a content integration platform in a process of displaying content according to an embodiment of the present disclosure.

As shown in FIG. 2, a call-out method on the content integration platform is illustrated by taking the shortcut icon corresponding to the content integration platform displayed in the side toolbar as an example. The user may call out a side toolbar 202 by swiping left on a terminal interface 201, and a file station control 203 may be displayed in the side toolbar 202. The file station control 203 is the shortcut control corresponding to the content integration platform. The user may call out the content integration platform by triggering the file station control 203.

In a possible embodiment, after the user triggers the shortcut icon corresponding to the content integration platform, the terminal may receive the call-out operation on the content integration platform, determine the data contents of the at least two content types to be integrated by the content integration platform, so as to obtain the data contents from specified locations.

In some embodiments, based on the data contents commonly used by the terminal, the data contents may be divided into the following categories: text type, file type, collection type, and so on. The text type may be application passwords, chat history, e-book text, etc., or other content that can be used for identification, copying and pasting. The file type may be downloaded documents, downloaded installation packages, pictures, audios, videos, etc., or other multimedia content. The collection type may be collections of pictures, collections of text, collections of video links, collections of web links, etc.

At block 102: obtaining the data contents on the basis of a content acquisition mode corresponding to the content types.

The content integration platform may be able to integrate data contents of various content types, storage locations of data contents of different content types may differ, and methods of obtaining the corresponding data contents may also differ. Therefore, in order to obtain data contents of various content types, it may be necessary to determine the content acquisition mode based on the content type of the data contents to be obtained, and then obtain the data contents from the specified storage location according to the content acquisition mode.

Figure 3:
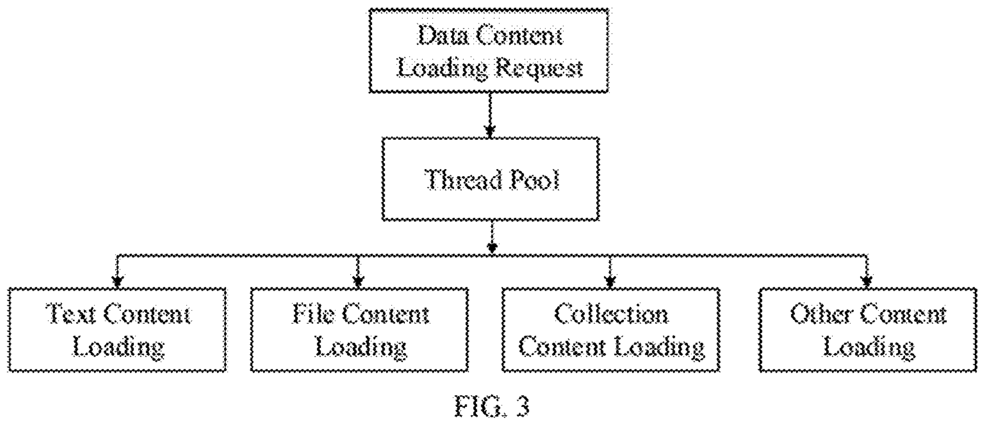
FIG. 3 is a flowchart of an asynchronous loading of content data.

In some embodiments, when the terminal obtains data contents corresponding to various content types, in order to improve an efficiency of data acquisition, an asynchronous method may be adopted for data acquisition, in which asynchronous threads are controlled through a thread pool, so as to simultaneously obtain data contents of various content types. As shown in FIG. 3, when the content type includes text type, file type, collection type, and other content, in response to a received request for obtaining data contents (data content loading request), an asynchronous thread control may be carried out through the thread pool, and multiple threads may simultaneously perform a text content loading, a file content loading, a content type loading, and an other content loading.

At block 103: displaying the data contents of the at least two content types in a platform floating window corresponding to the content integration platform.

In one possible embodiment, when the content integration platform obtains the data contents corresponding to the various content types, the platform floating window corresponding to the content integration platform is created, and the obtained data contents may be displayed in the platform floating window.

It should be noted that the content integration platform, different from other applications, may be displayed as a full-screen application. In order to facilitate the user to operate the data contents in the content integration platform on other application interfaces, the content integration platform may be configured to display the data contents in a platform floating window, that is to say, the platform floating window may be displayed on a top layer of any terminal interface, and the terminal interface may be an application interface of various applications.

In some embodiments, an area of displaying the platform floating window is limited while there may be several content types corresponding to the data contents in the terminal. Therefore, the data contents may be displayed in the platform floating window by parts. For example, a content type 1 and a content type 2 may be first displayed in the platform floating window, and the platform floating window may then be configured by the user to display a content type 3 and a content type 4 via a sliding or a page-turning operation.

In some embodiments, in order to display more data contents, the platform floating window may display the data contents via a simple mode. If a data content is an image, the image may be displayed in the platform floating window as a thumbnail. If a data content is a file, the platform floating window may display just a filename.

As shown in FIG. 2, when the user clicks on the file station control 203, the terminal may receive the call-out operation on the content integration platform, display a platform floating window 204 corresponding to the content integration platform, and display the obtained data contents in the platform floating window 204. In some embodiments, the obtained data contents may include text type, image content, and folder content. The obtained data contents may correspond to the content controls 205 displayed the platform floating window 204. By switching between each of the content controls 205, the data contents corresponding to each content control may be displayed in the platform floating window 204. The content controls 205 may correspond to the content type of the data contents.

At block 104: in response to a trigger operation on target data content in the platform floating window, processing the target data content.

In some embodiments, the platform floating window may also provide a function to directly process the displayed data contents, for example, a function to view data contents, a function to share data contents, a function to identify data contents, a function to edit data contents, and so on. Correspondingly, a trigger operation applied to the target data content may be a view operation, a share operation, an identification operation, an edit operation, and so on. A form of the trigger operation is not limited by the embodiment of the present disclosure.

In a possible embodiment, if the user needs to view the target data content in the platform floating window, they may click on the target data content. In this way, the corresponding terminal may receive a view operation applied to the target data content, launch an application corresponding to the target data content, and directly view the target data content. If the target data content is a picture, when the user clicks on the picture in the platform floating window, the terminal may directly launch the picture application and the picture application may have the picture displayed in its application interface.

As shown in FIG. 2, when the user clicks on a target picture 206 in the platform floating window 204, the terminal may receive a view operation applied to the target picture 206 and launch a photo album interface 207 to view the target picture 206. Correspondingly, the target picture 206 may be displayed in the photo album interface 207.

Therefore, in the embodiments of the present disclosure, the content integration platform is provided for the scenario of data content processing. The content integration platform may include the data contents that is able to integrate and display multiple content types, as well as a function to directly process the displayed data contents. By integrating data contents of various content types in the terminal and displaying the data contents in the platform floating window at once, the user may no longer need to view the specific data contents in the specific application and the user's efficiency of viewing the data contents in the terminal may be improved. In addition, by triggering the target data content in the platform floating window, data processing operations may be applied to the target data content without launching the particular applications and the efficiency of processing the data contents may be improved.

In some embodiments, the at least two content types may include the text type.

Obtaining the data contents on the basis of a content acquisition mode corresponding to the content types may include:

obtaining data contents from a clipboard listening service, in a case where the content type is the text type.

In some embodiments, obtaining data contents from a clipboard listening service in a case where the content type is the text type may include:

sending a content acquisition request to the clipboard listening service by the content integration platform, in a case where the content type is the text type;

verifying the content acquisition request by the clipboard listening service;

feeding back the data contents to the content integration platform, in a case where the content acquisition request passes the verification.

In some embodiments, obtaining data contents from a clipboard listening service in a case where the content type is the text type may further include:

launching the clipboard listening service during a terminal is in operation;

obtaining clipped content in real time in a system clipboard, in a case where the clipboard listening service monitors that the system clipboard is called;

storing the real-time clipped content in a system database corresponding to the clipboard listening service.

In some embodiments, verifying the content acquisition request by the clipboard listening service may include:

obtaining an application identification and an authorization code from the content acquisition request, where the application identification is an application identification corresponding to the content integration platform;

determining that the content acquisition request passes the verification, in a case where the authorization code matches a target authorization code and the application identification belongs to a set of target application identifications, given that the set of target application identifications contains application identifications corresponding to at least one authorized application;

determining that the content acquisition request fails to pass the verification, in a case where the authorization code does not match the target authorization code or the application identification does not belong to the set of target application identifications.

In some embodiments, processing the target data content in response to a trigger operation on target data content in the platform floating window may include:

updating the target data content in the platform floating window, in response to an edit operation applied to the target data content in the platform floating window.

In some embodiments, processing the target data content in response to a trigger operation on target data content in the platform floating window may include:

obtaining a target application indicated by a drag operation, in response to a drag-and-drop operation applied to the target data content in the platform floating window;

sharing the target data content to the target application.

In some embodiments, the at least two content types may further include at least one of the file type and the collection type.

In some embodiments, obtaining the data contents on the basis of a content acquisition mode corresponding to the content types may include:

obtaining the data contents from a system media library, in a case where the content type is the file type;

obtaining the data contents from a collection application, in a case where the content type is the collection type.

In some embodiments, before obtaining the data contents from a collection application in a case where the content type is collection type, the method may further include:

storing the data contents indicated by a data-collecting operation in the collection application, in a case where the data-collecting operation is executed by calling the collection application.

In some embodiments, displaying the data contents of the at least two content types in a platform floating window corresponding to the content integration platform may include:

obtaining updated time corresponding to the obtained data contents;

displaying the data contents of the at least two content types in the platform floating window based on the updated time chronologically.

In some embodiments, displaying the data contents of the at least two content types in a platform floating window corresponding to the content integration platform may include:

displaying the type controls corresponding to the content types in the platform floating window based on the content types corresponding to the data contents, where different content types correspond to different type controls;

displaying the data contents of the target content type corresponding to the target type control in the platform floating window, in response to the trigger operation applied to the target control type.

In a possible scenario, a method for obtaining a clipboard content is described through an example where the text type is the clipboard content. The clipboard content refers to the data contents that is copied and pasted as the user calls the system clipboard when the application is in operation.

Figure 4:
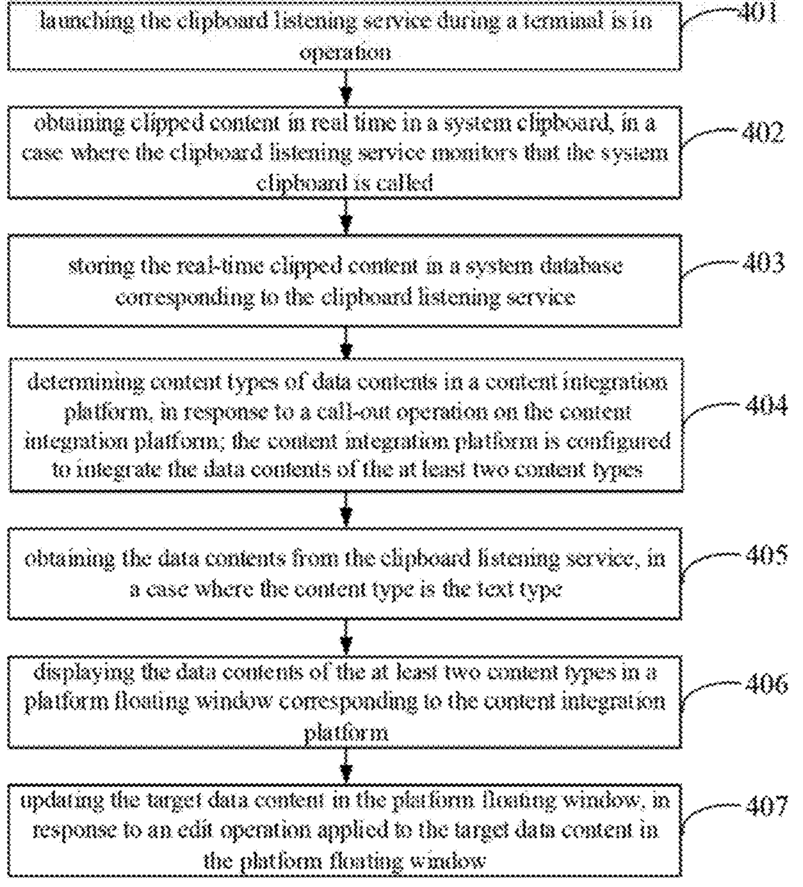
FIG. 4 is a flowchart of a data content processing method according to another embodiment of the present disclosure.

As shown in FIG. 4, a flowchart of a data content processing method according to another embodiment of the present disclosure is provided. This embodiment is illustrated by an example of the method being applied to a terminal and the method may include the following parts.

At block 401: launching the clipboard listening service during a terminal is in operation.

In order to monitor and obtain the clipped data contents generated during the terminal is in operation, the clipboard listening service may be installed in the terminal. The clipboard listening service is able to monitor the system clipboard. That is to say, the clipboard listening service may monitor and obtain the clipped data in real time from the system clipboard, then cache the real-time clipped data into a specified database, and provide an external data call interface. Therefore, the content integration platform may obtain clipped data contents that have been cached, i.e. the data contents corresponding to the text type, through the data call interface.

To monitor the clipped data contents in real time during the terminal is in operation, in a possible embodiment, the clipboard listening service may always be active during the terminal is in operation. That is to say, during the terminal is in operation, the clipboard listening service may be launched to monitor in real time whether the terminal generates the data contents corresponding to the text type.

In some embodiments, in order to ensure the privacy and safety of user data, the clipboard listening service may only be launched during the terminal is in operation given that user's permissions and authorizations are provided. In order to determining whether a user is allowed to launch the clipboard listening service, a prompt box for authorization purpose may be displayed when the user works with the content integration platform at a first time. When a user's confirmation is received from the prompt box (clicking on an authorization control provided in the prompt box), it may be determined that the user allows the clipboard listening service to be launched.

At block 402: obtaining clipped content in real time in a system clipboard, in a case where the clipboard listening service monitors that the system clipboard is called.

During an application is in operation, the system clipboard may be called every time a piece of content is copied or pasted. Therefore, the system clipboard may temporarily store the data contents that is about to be clipped. Correspondingly, the clipboard listening service may obtain the real-time clipped content by monitoring whether the system clipboard is called. Therefore, when the clipboard listening service monitors that the system clipboard is called, the clipboard listening service may obtain the real-time clipped content from the system clipboard and then cache the real-time clipped content in the system database.

It should be noted that the clipboard listening service is a service process independent of other applications or other system services. In other words, the clipboard listening service is not embedded in other applications or services and may be separately maintained and upgraded.

At block 403: storing the real-time clipped content in a system database corresponding to the clipboard listening service.

After obtaining the real-time clipped content from the system clipboard, the clipboard listening service may store the real-time clipped content in the system database so that the content integration platform may call the clipped content from the system database later. The system database is a database corresponding to the clipboard listening service.

To avoid a risk that the real-time clipped content is obtained by an illegal application and to ensure the safety of the data contents, in a possible embodiment, the obtained real-time clipped content may be encrypted and stored in the system database.

A symmetric encryption may be applied on the real-time clipped content, and a symmetric encryption algorithm may be DES, 3DES, AES, and so on. An asymmetric encryption may also be performed, and an asymmetric encryption algorithm may be RSA, DSA, and so on. A form of the encryption algorithm used for encryption is not limited by this embodiment.

At block 404: in response to a call-out operation on a content integration platform, determining content types of data contents in the content integration platform; the content integration platform is configured to integrate the data contents of the at least two content types.

The implementation of the block 404 may refer to the embodiments above, and the embodiments of the present disclosure will not be repeated herein.

At block 405: obtaining the data contents from the clipboard listening service, in a case where the content type is the text type.

Since the clipboard listening service provides the external data call interface, correspondingly, when the content integration platform needs to obtain the data contents corresponding to the text type, the content integration platform may obtain the data contents from the clipboard listening service by calling the external data call interface. The data contents are the real-time clipped content obtained and cached by the clipboard listening service when the system clipboard is called.

The block 405 may further include blocks 405A-405C.

At block 405A: sending a content acquisition request to the clipboard listening service by the content integration platform, in a case where the content type is the text type.

In a possible embodiment, when obtaining the data contents corresponding to the text type, the content acquisition request may be sent to the clipboard listening service by the content integration platform first, in order to request for the clipped data contents cached by the clipboard listening service.

At block 405B: verifying the content acquisition request by the clipboard listening service.

To avoid a risk that the clipped data contents are obtained by an illegal application through the external data call interface, the clipboard listening service may be required to verify the content acquisition request being received for obtaining the content. If the content acquisition request passes the verification, the data contents may be sent to a requestor, otherwise, no data contents or an empty data package would be sent to the requestor if the content acquisition request fails to pass the verification.

Verifying the content acquisition request may include the following parts.

Firstly, obtaining an application identification and an authorization code from the content acquisition request, where the application identification is an application identification corresponding to the content integration platform.

The content acquisition request may include the application identification and the authorization code so that the clipboard listening service may perform the verification based on the application identification and the authorization code. When developers are building the content integration platform, a unique application identification is provided and an authorization code is added to the content integration platform. Therefore, when the content integration platform is obtaining the data contents, the application identification and the authorization code may be carried by the content acquisition request.

In some embodiments, the application identification may be application package name, application signature, and so on.

Secondly, determining that the content acquisition request passes the verification, in a case where the authorization code matches a target authorization code and the application identification belongs to a set of target application identifications, given that the set of target application identifications contains application identifications corresponding to at least one authorized application.

In a possible embodiment, right after the clipboard listening service receives the content acquisition request, the application identification included in the content acquisition request and the authorization code included in the content acquisition request may be verified. When the authorization code matches a target authorization code and the application identification matches an application identification corresponding to an authorized application that is allowed to call the data contents, the content integration platform may be determined as the authorized applications, i.e. the content acquisition request passes the verification and the data contents may be sent to the content integration platform.

Thirdly, determining that the content acquisition request fails to pass the verification, in a case where the authorization code does not match the target authorization code or the application identification does not belong to the set of target application identifications.

Otherwise, if the authorization code does not match the target authorization code or the application identification does not belong to the set of target application identifications, it may be determined that the requestor is not authorized to call the data contents cached by the clipboard listening service and the content acquisition request fails correspondingly.

At block 405C: feeding back the data contents to the content integration platform, in a case where the content acquisition request passes the verification.

In a possible embodiment, after the clipboard listening service determines that the content acquisition request passes the verification, i.e. the requestor is authorized to call the data contents cached by the clipboard listening service, the data contents may be sent back to the content integration platform corresponding to the requestor.

In some embodiments, since the clipboard listening service may encrypt and store the real-time clipped content in the system database when the clipboard listening service obtains real-time clipped content. Correspondingly, after the clipboard listening service determines that the content acquisition request passes the verification, the clipboard listening service may decrypt an encrypted data and send a decrypted data contents to the content integration platform.

Figure 5:
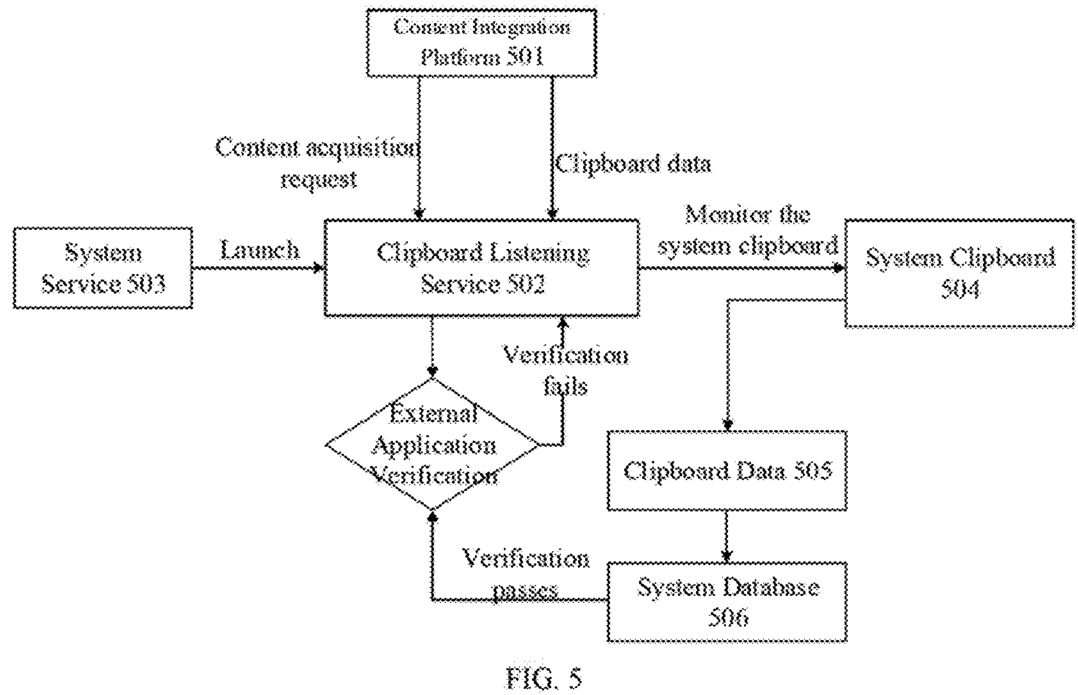
FIG. 5 is a flowchart of a data interaction among a content integration platform, a clipboard listening service and a system clipboard.

As shown in FIG. 5, a flowchart of a data interaction among a content integration platform, a clipboard listening service and a system clipboard is provided. During the terminal is in operation, the system service 503 may launch the clipboard listening service 502. During the clipboard listening service 502 is in operation, the system clipboard 504 may be monitored in real time by the clipboard listening service 502 and the clipboard listening service 502 may store the clipboard data 505 on the system clipboard 504 in the system database 506. After receiving a call-out operation on the content integration platform 501, the content integration platform 501 may send a content acquisition request to the clipboard listening service 502. After receiving the content acquisition request, the corresponding clipboard listening service 502 may perform an external application verification (i.e. verifying the content acquisition request). If the content acquisition request passes the verification, the corresponding clipboard listening service 502 may obtain a required clipboard data from the system database 506 and feed back the clipboard data to the content integration platform 501. Otherwise, if the content acquisition request fails to pass the verification, empty data may be sent back to the content integration platform 501.

At block 406: displaying the data contents of the at least two content types in a platform floating window corresponding to the content integration platform.

The implementation of the block 406 may refer to the embodiments above, and the embodiments of the present disclosure will not be repeated herein.

At block 407: updating the target data content in the platform floating window, in response to an edit operation applied to the target data content in the platform floating window.

When the content type is the text type, the content integration platform may allow the edit operation directly applied on the target data content in the platform floating window. The edit operation may be a delete operation, a pin-on-top operation, or a modification operation. When the edit operation applied on the target data content in the platform floating window is received, the target data content in the platform floating window may be updated based on a purpose indicated by the edit operation.

In some embodiments, when the edit operation of the target data content in the platform floating window is received, an edited target data content may be stored in a target storage location. The target storage location may be the same as a storage location of the target data content before editing so that the target data content after a last edit operation by the user may be displayed in the platform floating window when the platform floating window is called out later.

In some embodiments, when the edited target data content is stored, the target data content before being edited may be directly replaced so that a latest target data content may be displayed in the platform floating window later. Alternatively, the target data content before being edited may not be replaced, instead, the target data content before being edited may be stored in association with the edited target data content. In this way, both the edited target data content and the target data content before being edited may be displayed in association with each other when the data contents are displayed in the platform floating window later.

In some embodiments, if the edit operation is the delete operation, when the delete operation applied on the target data content in the platform floating window is received, it may be indicated that the user no longer wants to display the target data content in the platform floating window later. To avoid a risk that the content integration platform still obtains the target data content when the user calls out the content integration platform later, a delete mark may be added to the target data content indicated by the delete operation. Therefore, the content integration platform may stop obtaining the target data content with the deletion mark and stop displaying the target data content with the deletion mark in the platform floating window. In addition, adding the deletion mark may avoids directly deleting the target data content so that other applications may still call the target data content as normal.

Figure 6:
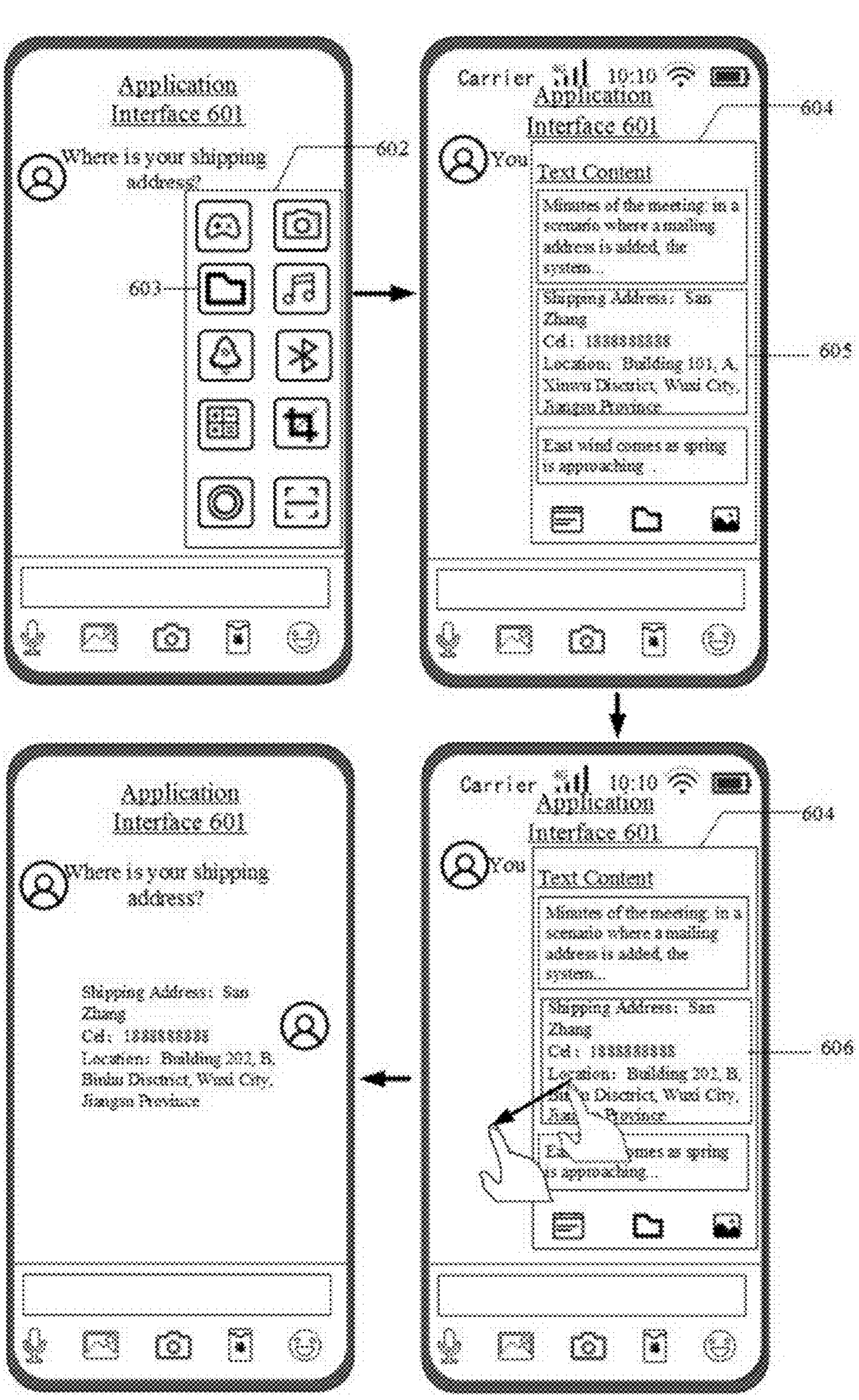
FIG. 6 is a schematic view illustrating a platform floating window in a process of editing target data content.

As shown in FIG. 6, a schematic view illustrating a platform floating window in a process of editing target data content is provided. When a user needs to send their shipping address to other users, the user may call out a side toolbar 602 in an application interface 601 and call out a platform floating window 604 corresponding to the content integration platform by triggering a file station control 603. The platform floating window 604 may display the text type, including a shipping address data 605. If the shipping address data is consistent with what the user intends to send, the user may directly drag the shipping address data 605 to the application interface 601 to finish a send operation applied on a shipping address. If the shipping address data 605 is not consistent with what the user intends to send, the user may directly modify a shipping address in the platform floating window 604 to obtain a modified shipping address data 606. Then, the modified shipping address data 606 may be dragged to the application interface 601 to finish the send operation applied on the shipping address.

In the present embodiment, the clipboard listening service may be set up to obtain and monitor the content being copied and pasted in the terminal. Verifying the content acquisition request may avoid a risk that the data contents are obtained by the illegal applications as well as a risk of private data leaks. Therefore, the security of the terminal data may be improved. In addition, the platform floating window may provide an edit function for the text type, so that the edited text may be sent by the drag-and-drop operation, and an efficiency of processing the data contents may be improved.

In some other scenarios, the content type may further include the file type, the collection type, and so on. The embodiments of the present disclosure may describe the method for obtaining the file type and the collection type in detail.

Figure 7:
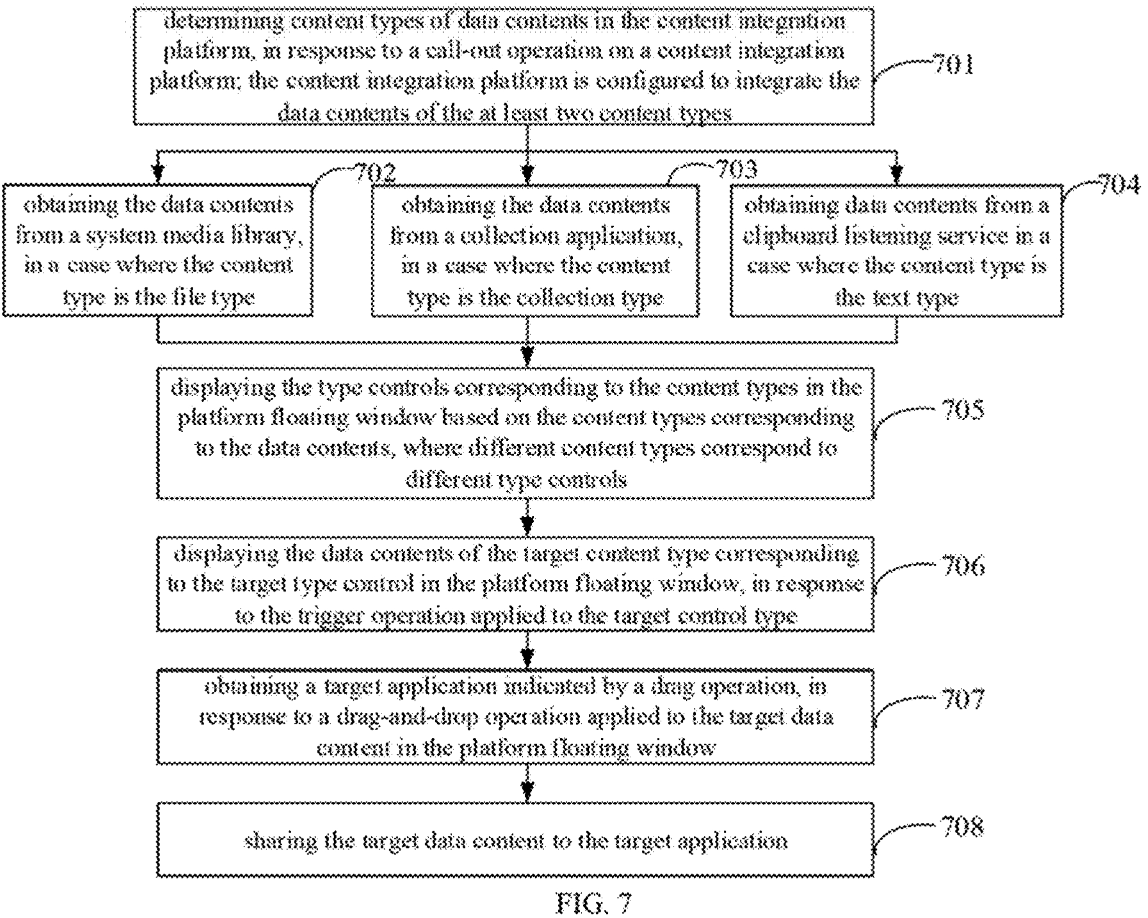
FIG. 7 is a flowchart of a data content processing method according to another embodiment of the present disclosure.

As shown in FIG. 7, a flowchart of a data content processing method according to another embodiment of the present disclosure is provided. This embodiment is illustrated by an example of the method being applied to a terminal and the method may include the following parts.

At block 701: determining content types of data contents in the content integration platform, in response to a call-out operation on a content integration platform; the content integration platform is configured to integrate the data contents of the at least two content types.

The implementation of the block 701 may refer to the embodiments above, and the embodiments of the present disclosure will not be repeated herein.

At block 702: obtaining the data contents from a system media library, in a case where the content type is the file type.

The file type may be pictures, text files, audio and video, and so on. The file type is generally stored in the system media library of the terminal. During the terminal is in operation, the system media library may monitor and scan a multimedia content stored in the terminal and the system media library may also store the multimedia content being scanned in the system media library. The system media library may record details of the multimedia content and modification time of the multimedia content. In addition, the system media library may provide an external content interface so that other applications in the terminal may access a multimedia data at any time.

In a possible embodiment, when the data contents corresponding to the file type need to be obtained, the data contents stored in the system media library may be obtained by calling the content interface in the system media library.

In some embodiments, while there is many multimedia content stored in the system media library, the content integration platform may not intend to obtain all the multimedia content. In a possible embodiment, when the content integration platform is requesting the data contents from the system media library, the intended data contents may be queried from the system media library by setting filters for certain conditions. The filter may set the condition related to a content modification time, a file type, and so on.

In some embodiments, for a data security concern in the system media library, a permission verification may be required when the data contents are being obtained. The permission verification may verify whether the content integration platform (or the requestor) has a permission to obtain the content data from the system media library.

The content integration platform may acquire a permission to obtain the data contents from the system media library, in a possible embodiment, through enabling the corresponding permission for the content integration platform in the setting interface by the user. In some embodiments, when the user uses the content integration platform for the first time, a prompt window may be provided to the user regarding whether they would like to enable the application permission.

Figure 8:
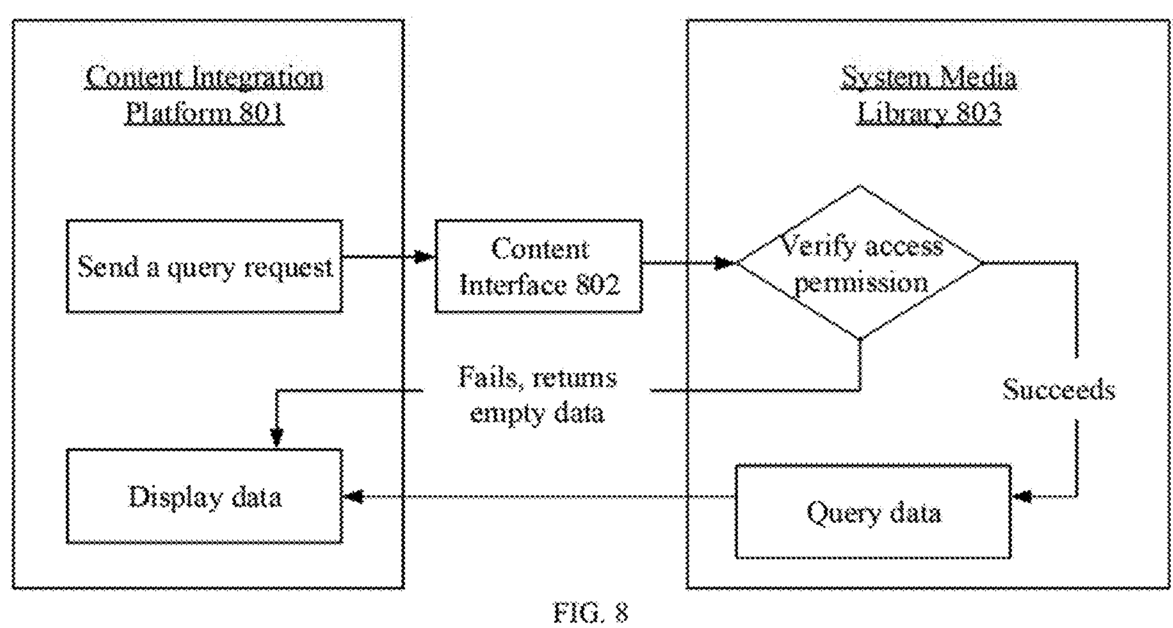
FIG. 8 is a flowchart illustrating how a content integration platform retrieves file type from a system media library.

As shown in FIG. 8, a flowchart illustrating how a content integration platform retrieves file type from a system media library is provided. When a content integration platform 801 needs to obtain the data contents corresponding to the file type, the content integration platform 801 may send a query request to a system media library 803 through a content interface 802 and the system media library 803 may verify whether the query request has an access permission. If the query request is verified, a data query based on the query request may be performed and a queried data contents may be sent back to the content integration platform 801 so that the content integration platform 801 may display a data based on the queried data contents. Otherwise, if the query request is not verified, an empty data may be to the content integration platform 801.

At block 703: obtaining the data contents from a collection application, in a case where the content type is the collection type.

It should be noted that the collection type in this embodiment refers to the data contents obtained from the collection application and the collection application has a data collection function and a data storage function. The data contents indicated by a data collection operation may be stored in the collection application when the collection application is called to perform a data collection operation. In addition, the collection application may provide the data call interface so that an external application may obtain the data contents stored in the collection application through the data call interface.

In a possible embodiment, to obtain the data contents corresponding to the collection type, a content acquisition request may be sent to the collection application by calling the data call interface corresponding to the collection application, so as to the collection data contents may be obtained as desired.

Figure 9:
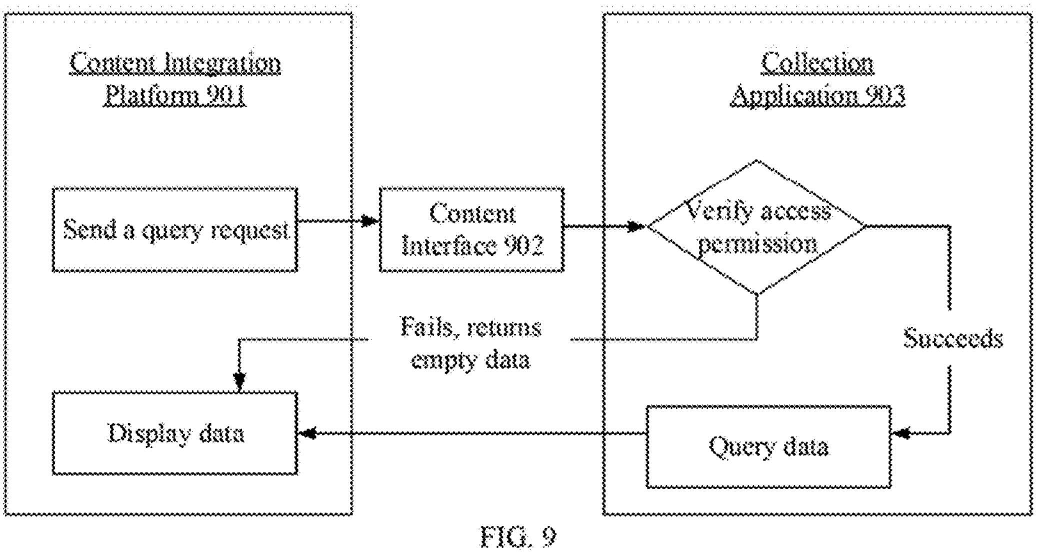
FIG. 9 is a flowchart illustrating how a content integration platform obtains data contents from a collection application.

As shown in FIG. 9, a flowchart illustrating how a content integration platform obtains data contents from a collection application is provided. When a content integration platform 901 needs to obtain the data contents corresponding to the collection type, the content integration platform 901 may send a query request to a collection application 903 through a content interface 902 and the collection application 903 may verify whether the query request has an access permission. If the query request is verified, a data query based on the query request may be performed and a queried data contents may be sent back to the content integration platform 901 so that the content integration platform 901 may display a data based on the queried data contents. Otherwise, if the query request is not verified, an empty data may be to the content integration platform 901.

At block 704: obtaining data contents from a clipboard listening service in a case where the content type is the text type.

The implementation of the block 704 may refer to the embodiments above, and the embodiments of the present disclosure will not be repeated herein.

At block 705: displaying the type controls corresponding to the content types in the platform floating window based on the content types corresponding to the data contents, where different content types correspond to different type controls.

Since an area of displaying the platform floating window is limited, in a possible embodiment, the data contents may be displayed in the platform floating window by types so that the data contents of each content type may be displayed. In other words, the data contents may be displayed in the platform floating window so that the user may switch between the data contents of different types in the platform floating window.

At block 706: displaying the data contents of the target content type corresponding to the target type control in the platform floating window, in response to the trigger operation applied to the target control type.

In a possible embodiment, when the trigger operation applied to the target type control is received, the terminal may determine that the user needs to display the data contents of the target content type in the platform floating window. In other words, the data contents may be displayed in the platform floating window so that the user may switch to display the data contents of different content types in the platform floating window.

Figure 10:
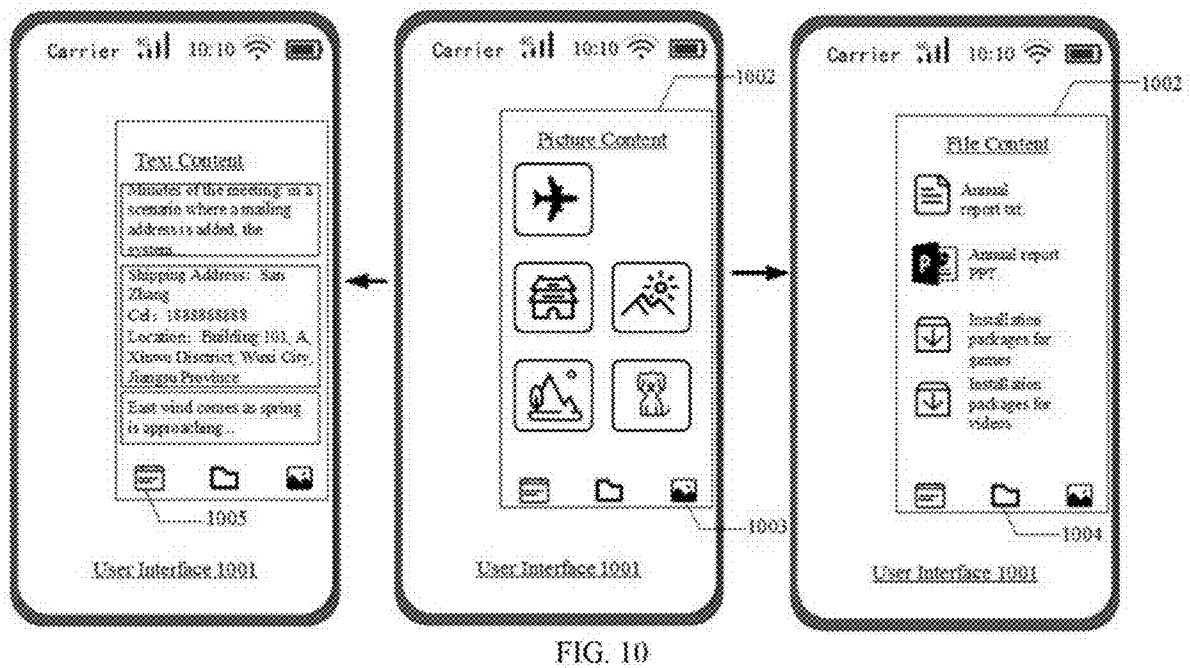
FIG. 10 is a schematic view illustrating a platform floating window in a process of displaying data contents.

As shown in FIG. 10, a schematic view illustrating a platform floating window in a process of displaying data contents is provided. A platform floating window 1002 corresponding to the content integration platform may be called out in a user interface 1001. A content control 1005 corresponding to text type, a content control 1003 corresponding to the picture content, and a content control 1004 corresponding to the file type may be displayed in the platform floating window 1002. When the platform floating window 1002 is called out, the picture content may be displayed by default. If the user clicks on the content control 1004, the platform floating window 1002 may be switched to display the file type. If the user clicks on the content control 1005, the platform floating window 1002 may be switched to display the text type.

In some embodiments, in addition to directly triggering the target type control to display the data contents of the target type control corresponding to the target content type in the platform floating window, it may be possible to switch between different data contents corresponding to different control types via the sliding operation.

In some embodiments, when the data contents of the target content type corresponding to the target type control is displayed in the platform floating window, the target type control may be displayed in a format different from other control types. For example, a background color may be added to the target type control when the target type control is triggered.

At block 707: obtaining a target application indicated by a drag operation, in response to a drag-and-drop operation applied to the target data content in the platform floating window.

In addition to performing a data content view operation and a data content edit operation in the platform floating window, the data contents in the platform floating window may also be shared to other applications. In a possible embodiment, the user may drag and drop the target data content to an application that they intend to share the target data content (a to-be-shared application interface) so that the target data content may be shared to a target application.

At block 708: sharing the target data content to the target application.

When the terminal receives the drag-and-drop operation applied on the target data by the user, the terminal may determine a target application indicated by the drag-and-drop operation and send the target data content to the target application so that the user may perform a content operation afterward in the target application. The target application indicated by the drag-and-drop operation is a target application corresponding to an end position when the drag-and-drop operation stops.

Figure 11:
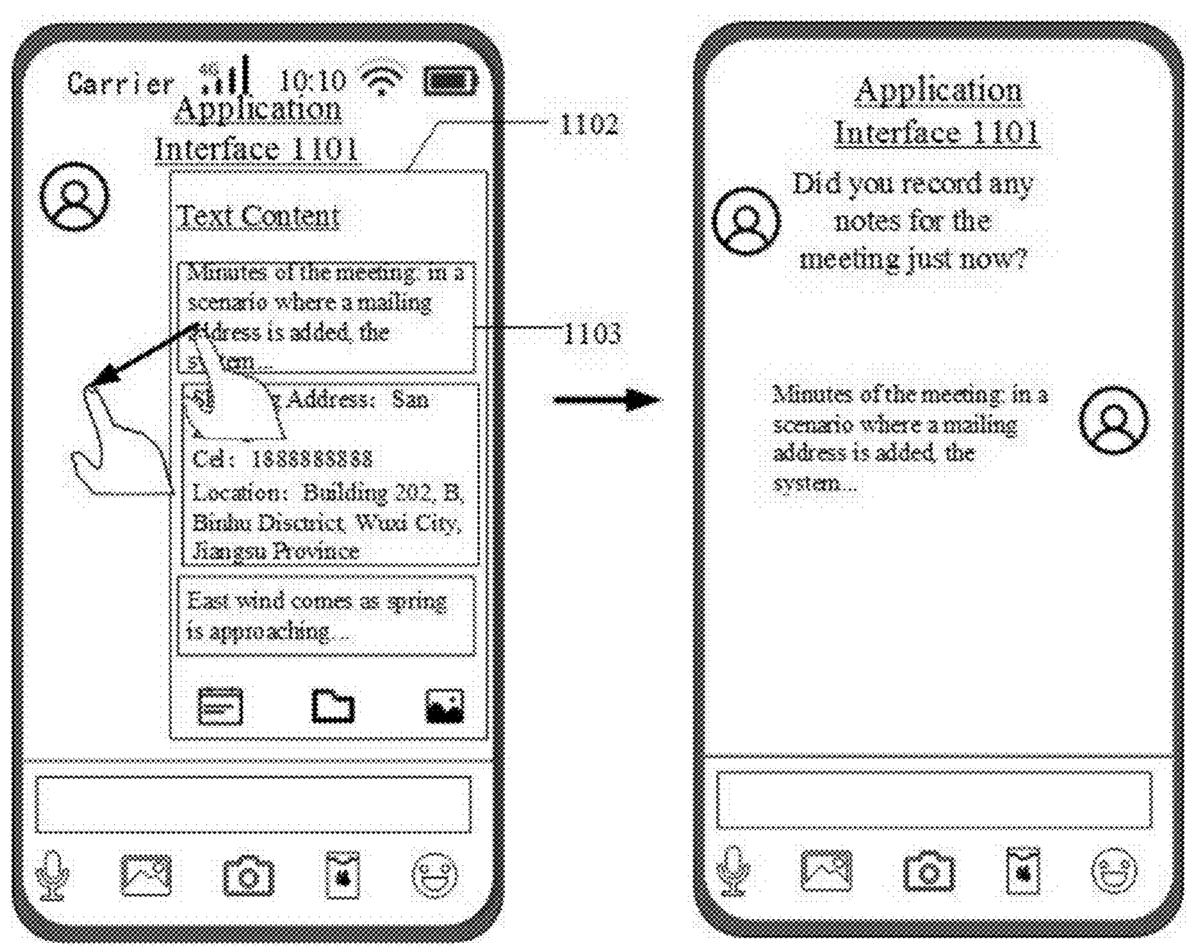
FIG. 11 is a schematic view illustrating a process of a drag-and-drop sharing according to an embodiment of the present disclosure.

As shown in FIG. 11, a schematic view illustrating a process of a drag-and-drop sharing according to an embodiment of the present disclosure is provided. When the user needs to share target data content 1103 in an application interface 1101, the user may drag the target data content 1103 to the application interface 1101. Correspondingly, the content integration platform may send the target data content 1103 to the target application corresponding to the application interface 1101 and perform an automatic send operation applied on the target data content 1103.

In some embodiments, since a sharing restriction may exist in some applications, for example, it may be not possible to send video-based data contents to a text-based application. Therefore, whether the selected target data content meets a requirement of the target application needs to be determined during the process of the drag-and-drop sharing. When the requirement is met, the target data content may be sent to the target application.

In some embodiments, the requirement of the target application may be at least one of the follows: a data content format requirement, a data volume requirement, and a content amount requirement. The data contents format requirement indicates that the data contents format of the target data content should be consistent with the data contents format that can be processed by the target application. For example, if the target application is a text-based application, the target data content may be a text, a web link, a text-based file, etc. and the target data content may not be an audio, a video, a picture, etc. The data volume requirement indicates that a data volume of the target data content should be less than or equal to a maximum data volume for a single processing of the target application. For example, if a maximum size of a file that can be shared by an instant messaging application at once is 50 MB, the data volume of the target data content needs to be less than or equal to 50 MB. The content amount requirement indicates that the number of content items included in the target data content should be less than or equal to the maximum number of content items that the target application can process at once. For example, if an instant messaging application allows nine images to be uploaded at the same time at maximum, a number of images included in a corresponding target data content needs to be less than or equal to nine.

Figure 12:
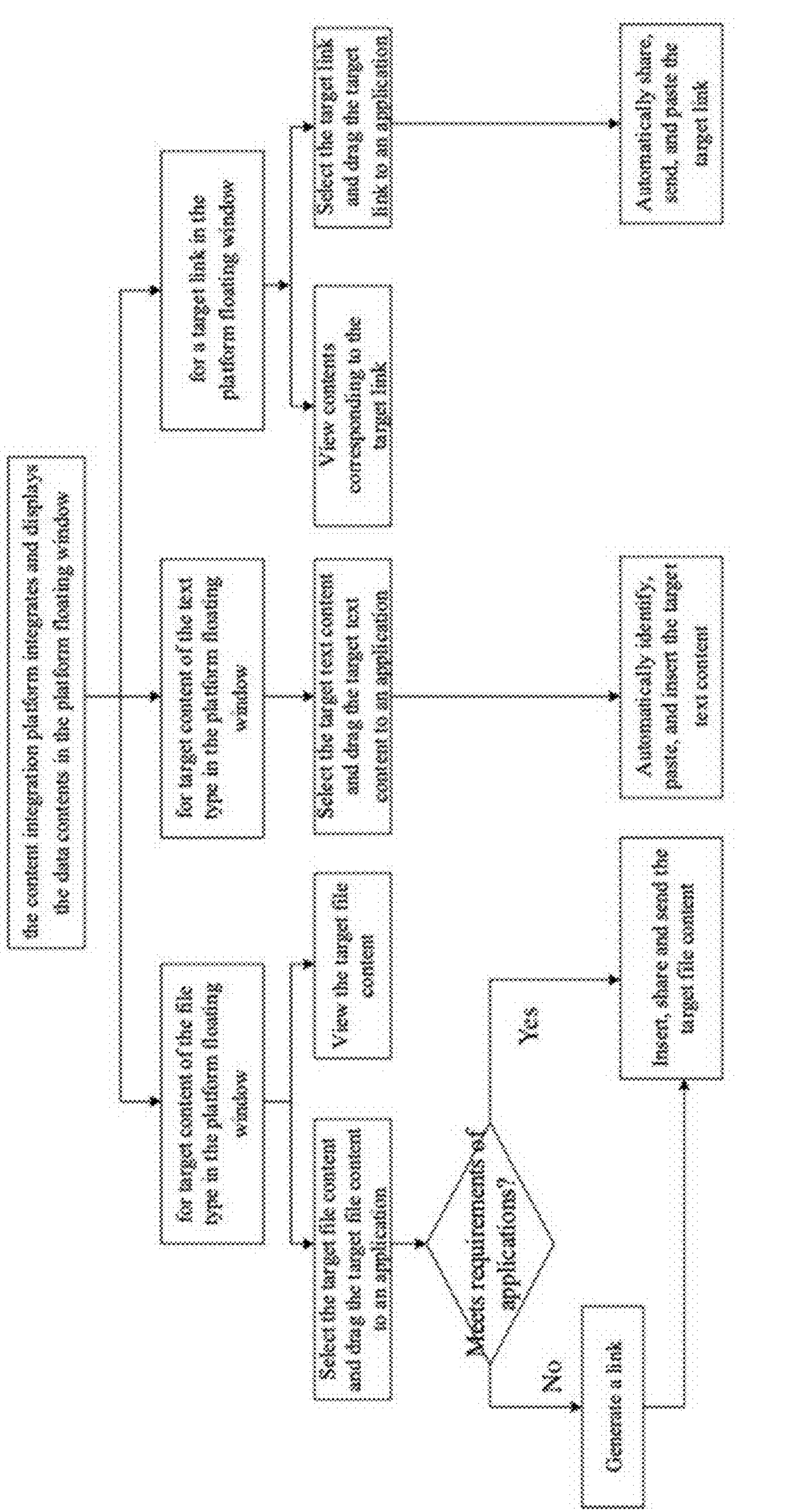
FIG. 12 is a functional block diagram of a content integration platform according to an embodiment of the present disclosure.

As shown in FIG. 12, a functional block diagram of a content integration platform according to an embodiment of the present disclosure is provided. When the content integration platform integrates and displays the data contents in the platform floating window, the user can perform corresponding operations on the data contents of different content types. For example, in speaking of target content of the file type in the platform floating window, the user may click to view the target file content, or, the user may select the target file content, then drag and drop the target file content to the application to perform a content processing operation. Before performing the content processing operation, the user needs to determine whether the target content of the file type meets a requirement of the application. If the requirement is met, the target file content may be inserted, shared, and sent. Otherwise, if the requirement is not met, a link may be generated and the link may be inserted, shared, and sent to the application. In speaking of target content of the text type in the platform floating window, if the target content of the text type is selected, dragged and dropped to the application, the target text content will be automatically identified, pasted, and inserted. In speaking of a target link in the platform floating window, content corresponding to the target link may be viewed by clicking the target link. In addition, if the target link may be selected, dragged and dropped to the application, the target link may be automatically shared, sent and pasted.

In the present embodiment, by obtaining data contents of the file type through an existing system media library and obtaining data contents of the collection type through the collection application, certain data access channels have been provided for both the file type and the collection type. In this way, a diversity of the content data and a comprehensiveness of the content data have been improved in the content integration platform. Furthermore, by dragging and dropping the data contents displayed in the platform floating window to the target application, the data contents may be shared to the target application directly. That is to say, the user no longer needs to open the application where the data contents are located and then perform the share operation. An efficiency of sharing the data contents may thus be improved.

Since only a limited area is available for display in the platform floating window and the user generally pays more attention to the recently generated data contents, in order to make the data contents displayed in the platform floating window more in line with a user's expectation as well as provide the user with their desired data contents in the limited area, in a possible embodiment, according to the modification time of the data contents, the data contents with a modification time closer to a current time may be prioritized to be displayed in the platform floating window.

Figure 13:
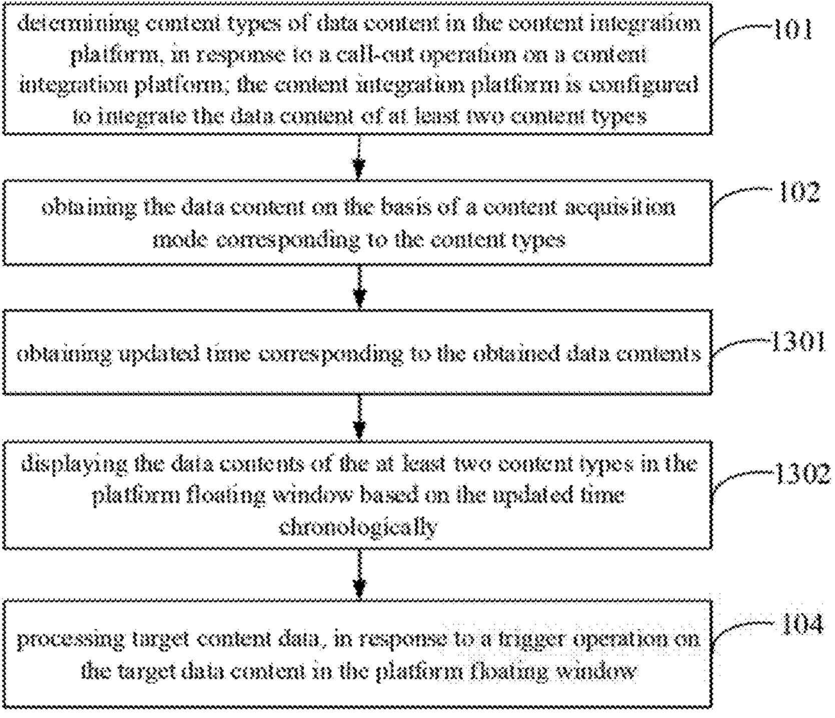
FIG. 13 is a flowchart of a data content processing method according to another embodiment of the present disclosure.

Based on FIG. 1, as shown in FIG. 13, the block 103 may further include a block 1301 and a block 1302.

At block 1301: obtaining updated time corresponding to the obtained data contents.

The updated time of the data contents is a content modification time that is most recent. When the data contents are being stored, a corresponding modification time may generally be stored as well. When the content integration platform is obtaining the data contents, the content integration platform may simultaneously obtain the updated time of the corresponding data contents in order to display the data contents based on the updated time.

In some embodiments, the updated time of the data contents may be a time at which the data contents are stored in a particular storage location. For example, given that a data content is the clipboard content, the updated time of the data contents may be the time at which the clipboard content is stored in the corresponding system database of the clipboard listening service. If the clipboard content is currently displayed in the platform floating window and an edit operation applied on the clipboard content is received, the updated time of the a data content is the time when the edit operation is performed on that clipboard content.

In some embodiments, to make the data contents displayed in the content integration platform matches user's previous behaviors, for example, if the user frequently uses the content integration platform to view a certain data content, the certain data content may be preferentially displayed even if an updated time of the certain data content is relatively earlier. Therefore, in a possible embodiment, when the data contents in the content integration platform is being displayed, the updated time and a view frequency in history may be considered together. A data content with a more recent updated time and a higher view frequency in history may be prioritized.

In some embodiments, when the content integration platform is obtaining the data contents, the content integration platform may also filter the data contents to be displayed according to a time condition. For example, if the time condition is limited to the last 7 days, correspondingly, the content integration platform only needs to obtain the data contents of the last 7 days.

At block 1302: displaying the data contents of the at least two content types in the platform floating window based on the updated time chronologically.

Since the user pays more attention to the recently generated data contents, in a possible embodiment, the data contents are temporarily displayed in the platform floating window based on the updated time chronologically. Specifically, a chronological order here indicates the more recent the updated time is, the higher, in position, the data contents may be displayed in the platform floating window.

Figure 14:
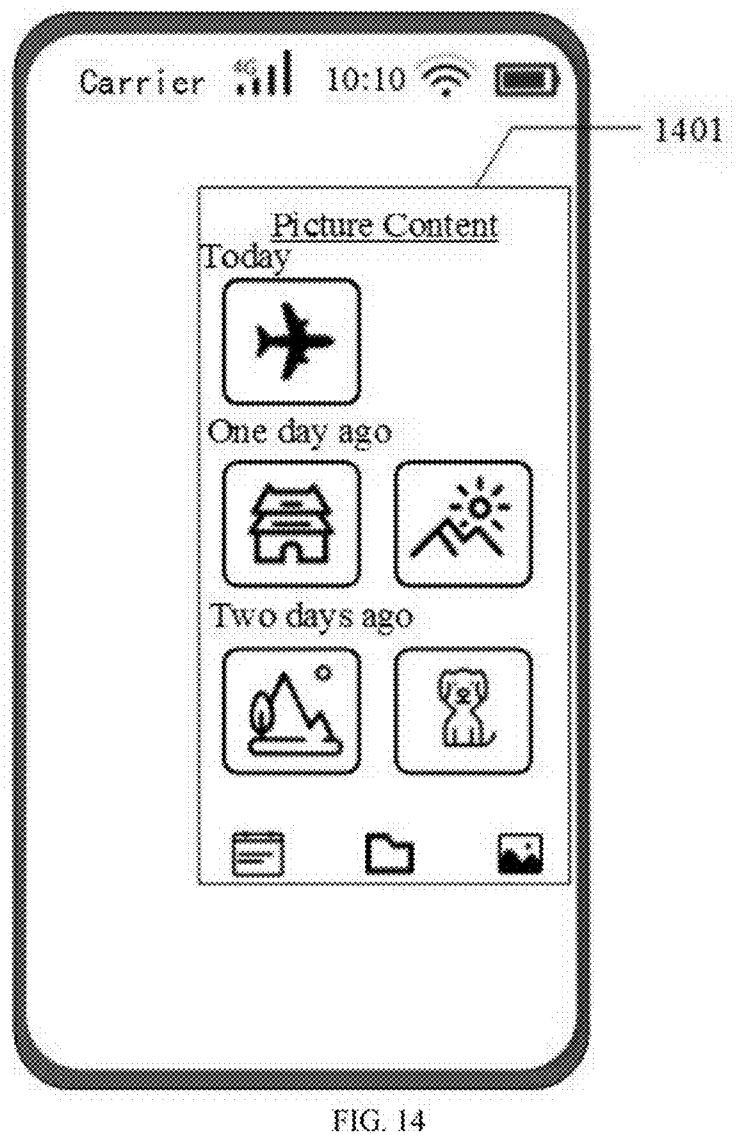
FIG. 14 is a schematic view illustrating a platform floating window in a process of displaying a type of data contents.

As shown in FIG. 14, a schematic view illustrating a platform floating window in a process of displaying a type of data contents is provided. Picture content is displayed in a platform floating window 1401 chronologically. For example, the picture content may be displayed in the platform floating window based on updated time, i.e. today—one day ago—two days ago. The more recent the updated time is, the higher, in position, the data contents may be displayed in the platform floating window.

In the present embodiment, the data contents are displayed in the platform floating window, based on the updated time chronologically, so that the data contents displayed in the platform floating window may become more in line with the user's expectation. The efficiency of processing the data contents may be improved as the user is no longer required to slide to search for the corresponding data contents.

Figure 15:
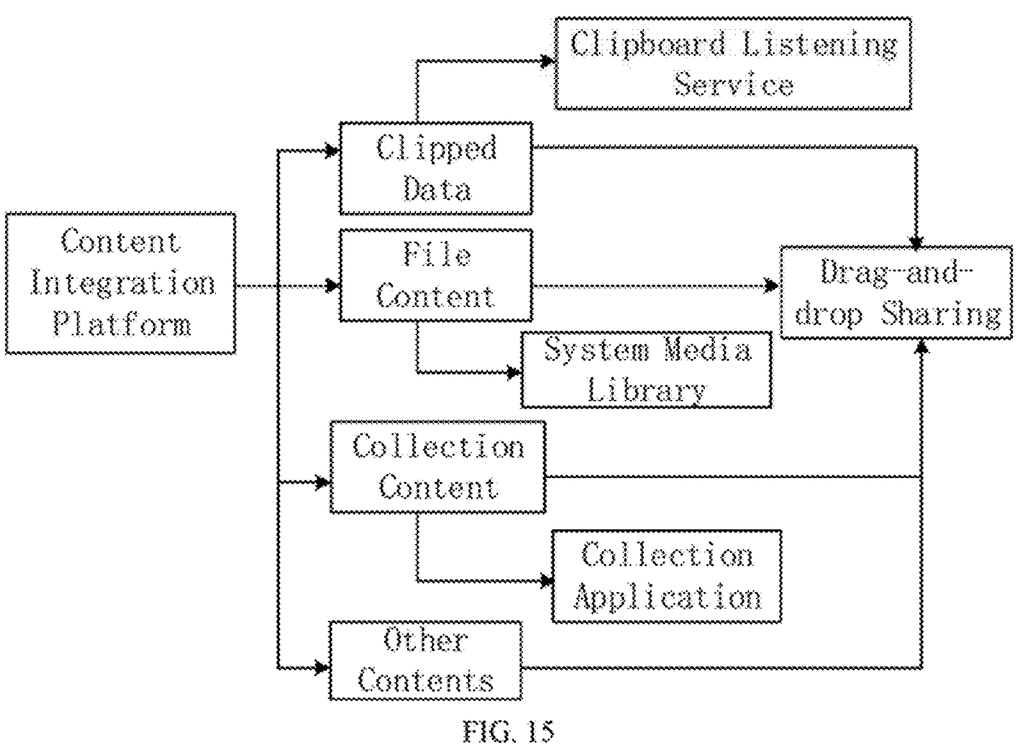
FIG. 15 is a diagram of core functions of a content integration platform.

According to the aforementioned embodiments, the content integration platform mainly includes the following core functional blocks: a window for displaying the content data (the platform floating window), the clipboard listening service, a data content loading, a data drag-and-drop sharing, and so on. As shown in FIG. 15, a diagram of core functions of a content integration platform is provided. The content integration platform may obtain the clipped data from the clipboard listening service, the file type from the system media library, the collection type from the collection application, and the other data contents. The clipped data, the file type, the collection type, and the other data contents are all integrated and displayed in the platform floating window corresponding to the content integration platform. The user may drag and drop to share the data contents in the platform floating window.

Figure 16:
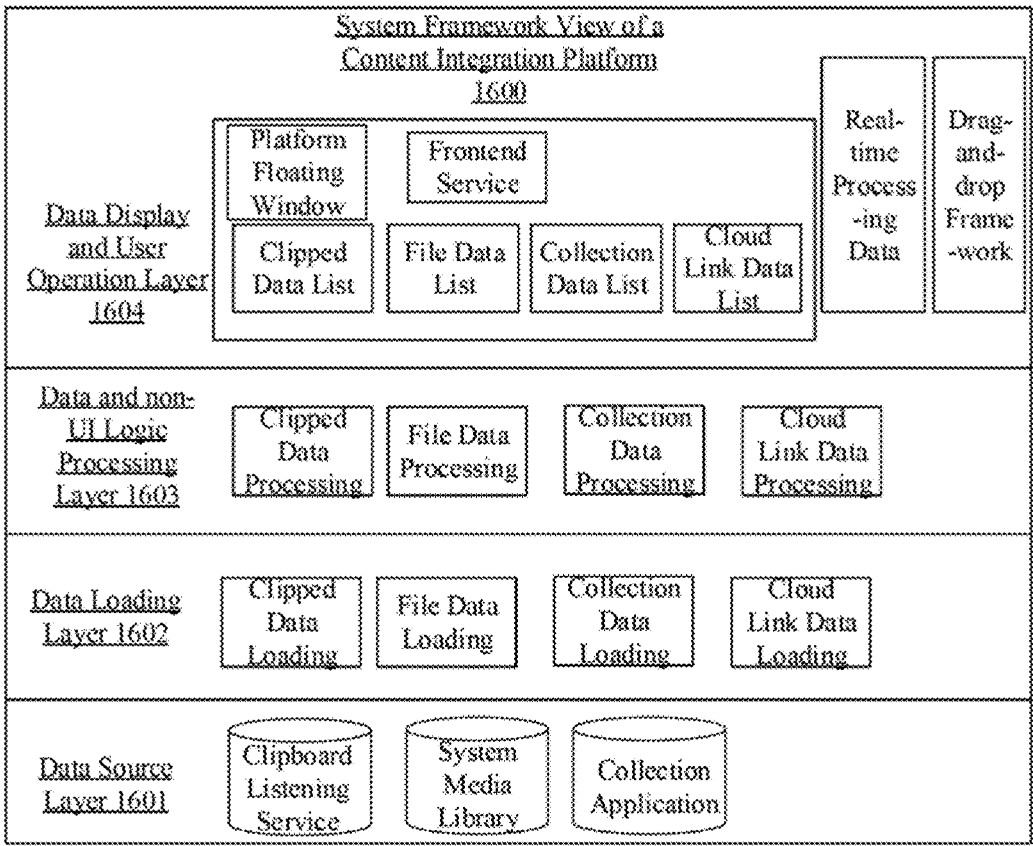
FIG. 16 is a system framework view of a content integration platform.

Based on core functional modules provided in FIG. 15, a system framework view of a content integration platform 1600 is shown in FIG. 16. A data source layer 1601 provides main data sources of the data contents displayed in the content integration platform. The main data sources may include the clipboard listening service, the system media library, and the collection application. A data loading layer 1602 is mainly configured to asynchronously load a variety of data contents while data sources of the data loading layer 1602 may come from data source layer 1601. A data and non-UI logic processing layer 1603 is mainly configured to obtain data by calling the data loading layer 1602 as well as processing non-UI related logic. A data display and user operation layer 1604 is mainly configured to display the data contents and receive the user's operation to circulate the data (by a drag-and-drop framework).

Figure 17:
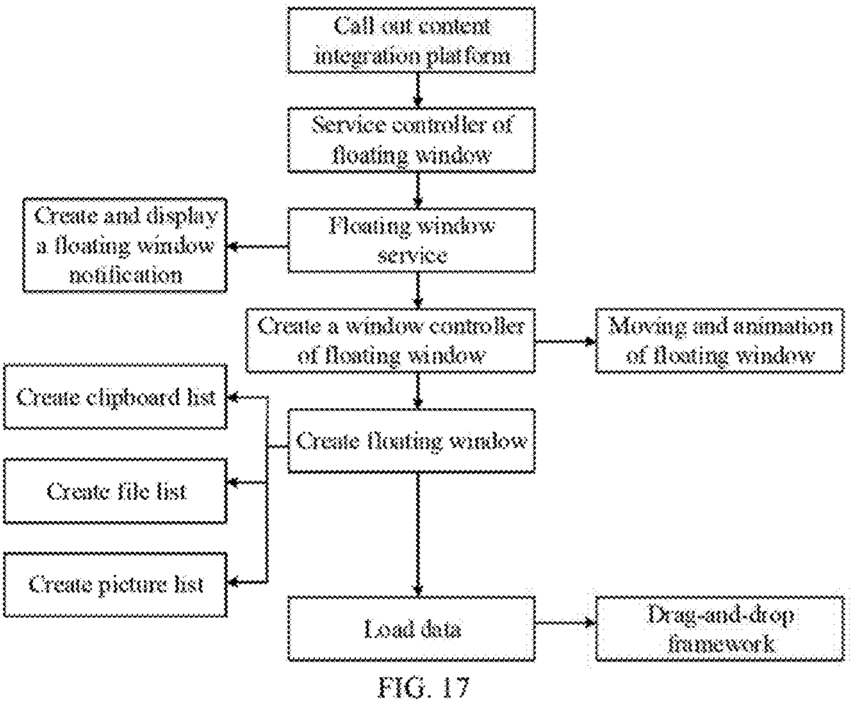
FIG. 17 is a flowchart of realizing a data display window.

A flowchart of realizing a data display window (i.e. the platform floating window corresponding to the content integration platform) is shown in FIG. 17. When the content integration platform is called out, a service controller of the floating window may start a floating window service and a floating window notification may be created and displayed to avoid the floating window service being blocked by the system. In addition, the floating window service may also create a window controller of the floating window and the window controller is configured to control the floating window to move and display animations. The service controller may also create a clipboard list, a file list, a picture list, and etc., to record individual data contents and realize a loading of the data contents, a display of the data contents, and a drag-and-drop sharing of the data contents (realized by the drag-and-drop framework). In some embodiments, when the content integration platform is closed, the service controller may control the floating window service to stop a frontend service and close the floating window; In some embodiments, the floating window may be recreated when the data related to the floating window is changed.

Figure 18:
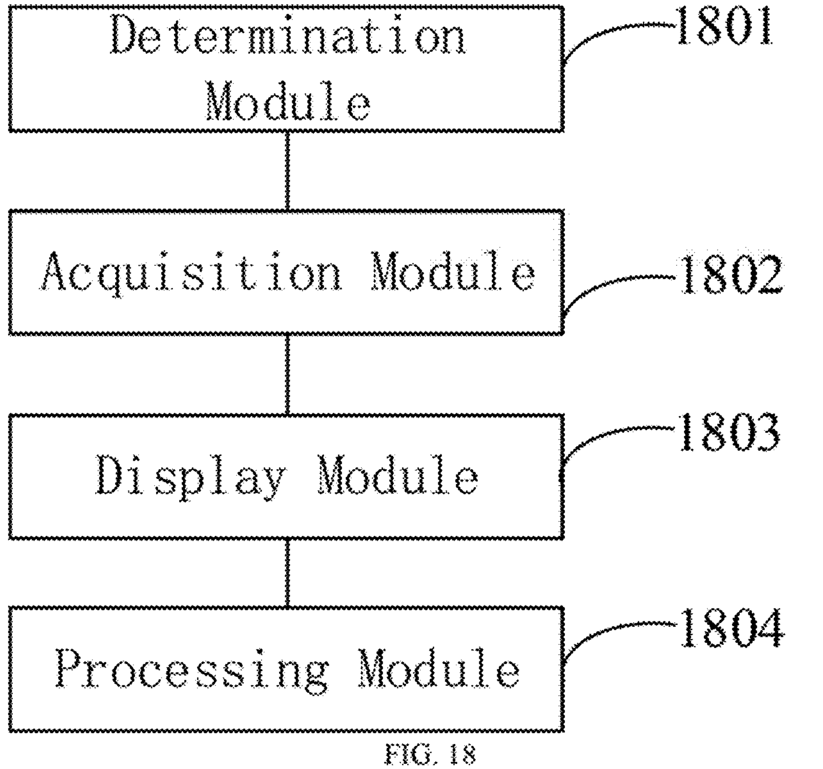
FIG. 18 is a structural block view of a data content processing apparatus according to an embodiment of the present disclosure.

As shown in FIG. 18, a structural block view of a data content processing apparatus according to an embodiment of the present disclosure is provided. The apparatus may be implemented as the terminal or a part of the terminal by a software, a hardware, or a combination of the software and the hardware. The apparatus may include the following modules.

A determination module 1801 is configured to determine content types of data contents in the content integration platform, in response to a call-out operation on a content integration platform. The content integration platform is configured to integrate the data contents of the at least two content types.

An acquisition module 1802 is configured to obtain the data contents based on content acquisition modes corresponding to the content types.

A display module 1803 is configured to display the data contents of the at least two content types in a platform floating window corresponding to the content integration platform.

A processing module 1804 is configured to process the target data content in response to a trigger operation on the target data content in the platform floating window.

In some embodiments, the at least two content types may include the text type.

The acquisition module 1802 may be further configured to perform the following operation:

obtaining data contents from a clipboard listening service in a case where the content type is the text type.

In some embodiments, the acquisition module may be further configured to perform the following operations:

sending a content acquisition request to the clipboard listening service by the content integration platform, in a case where the content type is the text type;

verifying the content acquisition request by the clipboard listening service;

feeding back the data contents to the content integration platform by the clipboard listening service, in a case where the content acquisition request passes the verification.

In some embodiments, the apparatus may further include the following modules.

A startup module is configured to launch the clipboard listening service during a terminal is in operation.

The acquisition module is further configured to obtain the clipped content in real time, in a case where the clipboard listening service monitors that the system clipboard is called.

A store module is configured to store the real-time clipped content in a system database corresponding to the clipboard listening service.

The acquisition module is configured to perform the following operations:

obtaining an application identification and an authorization code from the content acquisition request, where the application identification is an application identification corresponding to the content integration platform;

determining that the content acquisition request passes the verification, in a case where the authorization code matches a target authorization code and the application identification belongs to a set of target application identifications, given that the set of target application identifications contains application identifications corresponding to at least one authorized application;

determining that the content acquisition request fails to pass the verification, in a case where the authorization code does not match the target authorization code or the application identification does not belong to the set of target application identifications.

In some embodiments, the processing module 1804 may be further configured to perform the following operation:

updating the target data content in the platform floating window, in response to an edit operation applied to the target data content in the platform floating window.

In some embodiments, the processing module 1804 may be further configured to perform the following operation:

obtaining a target application indicated by a drag operation, in response to a drag-and-drop operation applied to the target data content in the platform floating window;

sharing the target data content to the target application.

In some embodiments, the at least two content types may further include at least one of the file type and the collection type.

The acquisition module 1802 may be further configured to perform the following operation:

obtaining the data contents from a system media library, in a case where the content type is the file type;

obtaining the data contents from a collection application, in a case where the content type is the collection type.

In some embodiments, the apparatus may further include the following module.

A store module is configured to store the data contents indicated by a data-collecting operation in the collection application, in a case where the data-collecting operation is executed by calling the collection application.

In some embodiments, the display module 1803 may be further configured to perform the following operations:

obtaining updated time corresponding to the obtained data contents;

displaying the data contents of the at least two content types in the platform floating window based on the updated time chronologically.

In some embodiments, the display module 1803 may be further configured to perform the following operations:

displaying the type controls corresponding to the content types in the platform floating window based on the content types corresponding to the data contents, where different content types correspond to different type controls;

displaying the data contents of the target content type corresponding to the target type control in the platform floating window, in response to the trigger operation applied to the target control type In an embodiment of the present disclosure, the content integration platform is provided for the scenario of data content processing. The content integration platform may include the data contents that is able to integrate and display multiple content types, as well as a function to directly process the displayed data contents. By integrating data contents of various content types in the terminal and displaying the data contents in the platform floating window at once, the user may no longer need to view the specific data contents in the specific application and the user's efficiency of viewing the data contents in the terminal may be improved. In addition, by triggering the target data content in the platform floating window, data processing operations may be applied to the target data content without launching the particular applications and the efficiency of processing the data contents may be improved.

Figure 19:
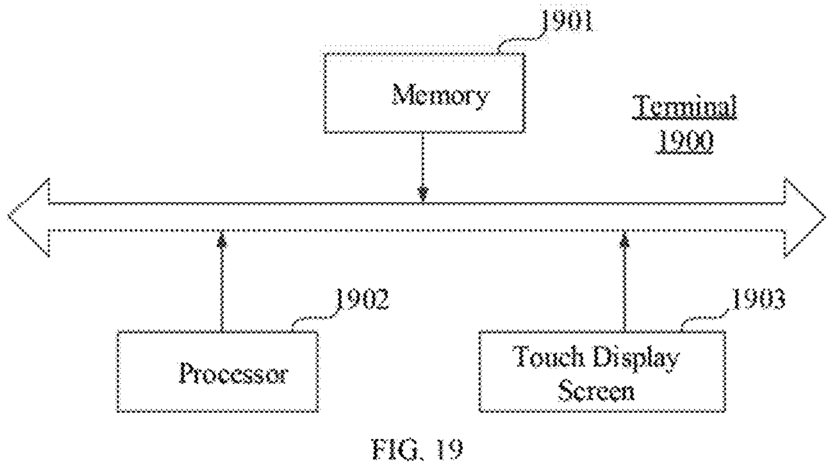
FIG. 19 is a structural block view of a terminal according to an embodiment of the present disclosure.

As shown in FIG. 19, a structural block view of a terminal 1900 according to an embodiment of the present disclosure is provided. The terminal 1900 in the present disclosure may include one or more components as follows: a memory 1901, a processor 1902, and a touch display screen 1903.

The memory 1901 may include Random Access Memory (RAM). The memory 1901 may also include Read-Only Memory (ROM). In some embodiments, the memory 1901 may include a non-transitory computer-readable storage medium. The memory 1901 may be configured to store instructions, programs, code, code sets, or instruction sets. The memory 1901 may include a program storage area and a data storage area. The program storage area may be configured to store instructions for implementing the operating systems, instructions for at least one function (e.g. a touch function, an audio playback function, and an image playback function, etc.), instructions for implementing each embodiment described below, and so on. The operating systems may be an Android system (including systems that are further developed based on the Android system), an IOS system developed by Apple (including systems that are further developed based on the IOS system), and other systems. The data storage area may be configured to store data created during the terminal 1900 is in operation (e.g. a phonebook, audio/video data and chat history), etc.

The processor 1902 may include one or more processor cores. The processor 1902 may be configured to perform various functions provided by the terminal 1900 and process data through utilizing interfaces and wiring to connect various components throughout the terminal 1900, running or executing instructions, programs, code sets, or instructions sets stored in the memory 1901, as well as calling data stored in the memory 1901. In some embodiments, the processor 1902 may be implemented in at least one form of hardware as follows: a Digital Signal Processing (DSP), a Field-Programmable Gate Array (FPGA), and a Programmable LogicArray (PLA). The processor 1904 may integrate one or a combination of a Central Processing Unit (CPU), a Graphics Processing Unit (GPU), a modem, and so on. The CPU may primarily deal with operating systems, user interfaces and application programs, etc.; the GPU may be responsible for rendering and drawing content required to be displayed by a touch display screen; and the modem may handle wireless communication. It should be understood that the modem does not have to be integrated into the processor 1902 and may instead be implemented via a chip alone.

In some embodiments, the touch display screen 1903 may further be included in the terminal 1900. The touch display screen 1903 may be a capacitive touch display screen and the capacitive touch display screen is configured to receive touch operations applied on or near it by users using a finger, a stylus, or any other suitable objects, as well as to display user interfaces of applications. The touch display screen 1903 may be typically provided on a front panel of the terminal 1900. The touch display screen 1903 may be designed as a full screen, a curved screen, or a non-flat screen. The touch display screen 1903 may also be designed as a combination of the full screen and the curved screen or a combination of the non-flat screen and the curved screen. The embodiments of the present disclosure may not limit a shape of the touch display screen 1903.

Furthermore, the skilled in the art should understand that a structure of the terminal 1900 illustrated in the aforementioned drawings may not limit the terminal 1900. The terminal may include more or fewer components than illustrated, a combination of certain components, or a different arrangement of components. For example, the terminal 1900 may also include components such as a radio frequency (RF) circuit, an input unit, an audio circuit, a Wireless-Fidelity (Wi-Fi) module, a power supply, and a Bluetooth module, etc., which will not be described herein.

Some embodiments of the present disclosure may also provide a computer-readable storage medium. The computer storage medium may store at least one instruction and the at least one instruction may be executed by a processor to implement methods of processing the data contents as described in the embodiments above.

In another aspect, the present disclosure may provide a computer program product. The computer program product may include at least one computer instruction. The at least one computer instruction may be stored in the computer-readable storage medium. A processor of the terminal may read the at least one computer instruction from the computer-readable storage medium. The processor may execute the at least one computer instruction so that the terminal may execute the methods of processing the data contents provided in some embodiments of the present disclosure above.

The skilled in the art should be noted that, in one or more examples illustrated above, functionalities described in the present disclosure may be implemented using hardware, software, firmware, or any combination thereof. When the functionalities are implemented using the software, the functionalities may be stored in the computer-readable medium or transmitted as one or more instructions or codes on the computer-readable medium. The computer-readable medium may include a computer storage medium and a communication medium. The communication medium may include any medium that facilitates a transmission of a computer program from one location to another. The computer storage medium may be any available medium that can be accessed by a general computer or a specialized computer.

What have been mentioned above are only some optional embodiments of the present disclosure and are not intended to limit the scope of the present disclosure. Any modifications, equivalent substitutions, improvements, etc. made under the spirit and principles of the present disclosure shall be included in the scope of protection of the present disclosure.

What is claimed is:

1. A method for processing data contents, comprising:

determining content types of data contents in a content integration platform, in response to a call-out operation applied on the content integration platform, wherein the content integration platform is configured to integrate data contents of at least two content types, and one content type of the at least two content types is text type;

obtaining the data contents based on content acquisition modes corresponding to the content types, wherein the obtaining the data contents based on content acquisition modes corresponding to the content types comprises obtaining the data contents from a clipboard listening service in a case where the one content type of the at least two content types is the text type;

displaying the data contents of the at least two content types in a platform floating window corresponding to the content integration platform; and processing target data content, in response to a trigger operation on the target data content in the platform floating window;

wherein the obtaining the data contents from a clipboard listening service in a case where the one content type of the at least two content types is the text type comprises:

sending a content acquisition request to the clipboard listening service by the content integration platform in a case where the content type is the text type; and verifying the content acquisition request by the clipboard listening service comprising:

obtaining, by the clipboard listening service, an application identification and an authorization code from the content acquisition request, wherein the application identification is an application identification corresponding to the content integration platform;

determining, by the clipboard listening service, that the content acquisition request passes the verification, in a case where the authorization code matches a target authorization code and the application identification belongs to a set of target application identifications, wherein the set of target application identifications contains application identifications corresponding to at least one authorized application; and determining, by the clipboard listening service, that the content acquisition request fails to pass the verification, in a case where the authorization code does not match the target authorization code or the application identification does not belong to the set of target application identifications.

2. The method as claimed in claim 1, wherein the obtaining the data contents from a clipboard listening service in a case where the one content type of the at least two content types is the text type, further comprises:

feeding back the data contents to the content integration platform by the clipboard listening service, in a case where the content acquisition request passes the verification.

3. The method as claimed in claim 1, wherein before the obtaining the data contents from a clipboard listening service in a case where the one content type of the at least two content types is the text type, the method further comprises:

launching the clipboard listening service during a terminal is in operation;

obtaining clipped content in real time in a system clipboard, in a case where the clipboard listening service monitors that the system clipboard is called; and storing the real-time clipped content in a system database corresponding to the clipboard listening service.

4. The method as claimed in claim 3, wherein the application identification comprises at least one of an application package name or an application signature;

the storing the real-time clipped content in a system database corresponding to the clipboard listening service, comprises:

storing an encrypted data, obtained by encrypting the real-time clipped content, in a system database corresponding to the clipboard listening service;

the feeding back the data contents to the content integration platform by the clipboard listening service, comprises:

obtaining, by the clipboard listening service, the encrypted data corresponding to the content acquisition request from the system database;

decrypting, by the clipboard listening service, the encrypted data to obtain the data contents;

feeding back the data contents to the content integration platform by the clipboard listening service.

5. The method as claimed in claim 1, wherein the processing target data content in response to a trigger operation on the target data content in the platform floating window, comprises:

updating the target data content in the platform floating window, in response to an edit operation applied to the target data content in the platform floating window.

6. The method as claimed in claim 1, wherein the processing target data content in response to a trigger operation on the target data content in the platform floating window, comprises:

obtaining a target application indicated by a drag operation, in response to a drag-and-drop operation applied to the target data content in the platform floating window; and sharing the target data content to the target application.

7. The method as claimed in claim 6, wherein the sharing the target data content to the target application, comprises:

sharing the target data content to the target application, in a case where the target data content is determined to meet a requirement of the target application;

wherein the requirement of the target application comprises at least one of the follows: a data content format requirement, a data volume requirement, and a content amount requirement.

8. The method as claimed in claim 1, wherein the at least two content types further comprise at least one of a file type and a collection type;

the obtaining the data contents based on the content acquisition modes corresponding to the content types, comprises:

obtaining the data contents from a system media library, in a case where the content type is the file type; and obtaining the data contents from a collection application, in a case where the content type is the collection type.

9. The method as claimed in claim 8, wherein before the obtaining the data contents from a collection application in a case where the content type is the collection type, the method further comprises:

storing data contents indicated by a data collection operation in the collection application, in a case where the collection application is called to perform the data collection operation.

10. The method as claimed in claim 1, wherein the displaying the data contents of the at least two content types in a platform floating window corresponding to the content integration platform, comprises:

obtaining updated time corresponding to the obtained data contents; and displaying the data contents of the at least two content types in the platform floating window based on the updated time chronologically.

11. The method as claimed in claim 1, wherein the displaying the data content of the at least two content types in a platform floating window corresponding to the content integration platform, comprises:

displaying type controls corresponding to the content types in the platform floating window based on the content types corresponding to the data contents, wherein different content types correspond to different type controls; and displaying the data contents of a target content type corresponding to a target type control in the platform floating window, in response to a trigger operation applied to the target control type.

12. A terminal, comprising a processor and a memory; wherein the memory stores at least one instruction; when the at least one instruction is loaded and executed by the processor, the processor is caused to perform a method for processing data contents; the method comprises:

determining content types of data contents in a content integration platform, in response to a call-out operation applied on the content integration platform, wherein the content integration platform is configured to integrate data contents of at least two content types, and one content type of the at least two content types is text type:

obtaining the data contents based on content acquisition modes corresponding to the content types, wherein the obtaining the data contents based on content acquisition modes corresponding to the content types comprises obtaining the data contents from a clipboard listening service in a case where the one content type of the at least two content types is the text type;

displaying the data contents of the at least two content types in a platform floating window corresponding to the content integration platform; and processing target data content, in response to a trigger operation on the target data content in the platform floating window;

wherein the obtaining the data contents from a clipboard listening service in a case where the one content type of the at least two content types is the text type, comprises:

sending a content acquisition request to the clipboard listening service by the content integration platform, in a case where the content type is the text type; and verifying the content acquisition request by the clipboard listening service comprising:

obtaining, by the clipboard listening service, an application identification and an authorization code from the content acquisition request, wherein the application identification is an application identification corresponding to the content integration platform;

determining, by the clipboard listening service, that the content acquisition request passes the verification, in a case where the authorization code matches a target authorization code and the application identification belongs to a set of target application identifications, wherein the set of target application identifications contains application identifications corresponding to at least one authorized application; and determining, by the clipboard listening service, that the content acquisition request fails to pass the verification, in a case where the authorization code does not match the target authorization code or the application identification does not belong to the set of target application identifications.

13. The terminal as claimed in claim 12, wherein the obtaining the data contents from a clipboard listening service in a case where one content type of the at least two content types is the text type, the method further comprises:

feeding back the data contents to the content integration platform by the clipboard listening service, in a case where the content acquisition request passes the verification.

14. The terminal as claimed in claim 12, wherein before the obtaining the data contents from a clipboard listening service in a case where one content type of the at least two content types is the text type, the method further comprises:

launching the clipboard listening service during a terminal is in operation;

obtaining clipped content in real time in a system clipboard, in a case where the clipboard listening service monitors that the system clipboard is called; and storing the real-time clipped content in a system database corresponding to the clipboard listening service.

15. The terminal as claimed in claim 12, wherein the processing target data content in response to a trigger operation on the target data content in the platform floating window, comprises:

updating the target data content in the platform floating window, in response to an edit operation applied to the target data content in the platform floating window.

16. A non-transitory computer-readable storage medium, wherein the non-transitory computer-readable storage medium stores at least one instruction; when the at least one instruction is executed by a processor, the processor is caused to perform a method for processing data contents; the method comprises:

determining content types of data contents in a content integration platform, in response to a call-out operation applied on the content integration platform, wherein the content integration platform is configured to integrate data contents of at least two content types, and one content type of the at least two content types is text type:

obtaining the data contents based on content acquisition modes corresponding to the content types, wherein the obtaining the data contents based on content acquisition modes corresponding to the content types comprises obtaining the data contents from a clipboard listening service in a case where the one content type of the at least two content types is the text type;

displaying the data contents of the at least two content types in a platform floating window corresponding to the content integration platform; and processing target data content, in response to a trigger operation on the target data content in the platform floating window;

wherein the obtaining the data contents from a clipboard listening service in a case where one content type of the at least two content types is the text type, comprises:

sending a content acquisition request to the clipboard listening service by the content integration platform, in a case where the content type is the text type; and verifying the content acquisition request by the clipboard listening service comprising:

obtaining, by the clipboard listening service, an application identification and an authorization code from the content acquisition request, wherein the application identification is an application identification corresponding to the content integration platform;

determining, by the clipboard listening service, that the content acquisition request passes the verification, in a case where the authorization code matches a target authorization code and the application identification belongs to a set of target application identifications, wherein the set of target application identifications contains application identifications corresponding to at least one authorized application; and determining, by the clipboard listening service, that the content acquisition request fails to pass the verification, in a case where the authorization code does not match the target authorization code or the application identification does not belong to the set of target application identifications.

17. The non-transitory computer-readable storage medium as claimed in claim 16, wherein the obtaining the data contents from a clipboard listening service in a case where one content type of the at least two content types is the text type, further comprises:

feeding back the data contents to the content integration platform by the clipboard listening service, in a case where the content acquisition request passes the verification.

18. The non-transitory computer-readable storage medium as claimed in claim 16, wherein before the obtaining the data contents from a clipboard listening service in a case where one content type of the at least two content types is the text type, the method further comprises:

launching the clipboard listening service during a terminal is in operation;

obtaining clipped content in real time in a system clipboard, in a case where the clipboard listening service monitors that the system clipboard is called; and storing the real-time clipped content in a system database corresponding to the clipboard listening service.

* * * * *